(12) United States Patent
Bonafe et al.

(10) Patent No.: US 12,511,607 B2
(45) Date of Patent: *Dec. 30, 2025

(54) READER DEVICE TECHNOLOGY FOR DETERMINING THAT AN ASSET IS LOADED TO THE ASSIGNED LOGISTICS VEHICLE

(71) Applicant: United Parcel Service of America, Inc., Atlanta, GA (US)

(72) Inventors: Jethro Bonafe, Atlanta, GA (US); Christopher Azar, Atlanta, GA (US); Dennis Bautista, Atlanta, GA (US); Vincent Pizzuto, Atlanta, GA (US); Derek Uber, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/047,330

(22) Filed: Feb. 6, 2025

(65) Prior Publication Data
US 2025/0182038 A1    Jun. 5, 2025

Related U.S. Application Data

(63) Continuation of application No. 18/091,763, filed on Dec. 30, 2022, now Pat. No. 12,248,904.

(51) Int. Cl.
*G06Q 10/0833* (2023.01)
*G06K 7/10* (2006.01)

(52) U.S. Cl.
CPC ..... *G06Q 10/0833* (2013.01); *G06K 7/10297* (2013.01)

(58) Field of Classification Search
CPC ............ G06Q 10/0832; G06Q 10/083; G06Q 10/0833
See application file for complete search history.

(56) References Cited

U.S. PATENT DOCUMENTS 10,728,709 B1 * 7/2020 Catalena ............... H04W 48/08
11,250,373 B1    2/2022 Condron
(Continued)

OTHER PUBLICATIONS

Kalle, "How to do accurate indoor positioning with Bluetooth beacons?," Published by landlordterminal.com, Jul. 28, 2017, Retrieved from https://proximi.io/accurate-indoor-positioning-bluetooth-beacons/ (Year: 2017).*

*Primary Examiner* — Shannon S Campbell
*Assistant Examiner* — Bryan J Kirk
(74) *Attorney, Agent, or Firm* — Shook, Hardy & Bacon L.L.P.

(57) ABSTRACT

In various embodiments, a first tag is associated with a first parcel that is to be delivered. A data structure is accessed that indicates that the first parcel is assigned to be placed in a first logistics vehicle of a plurality of logistics vehicles. An indication is received that a first device, which may be located inside, on, or in proximity to the first logistics vehicle, has read data of the first tag. A determination is made that the first parcel has been placed inside the first assigned logistics vehicle and a notification is transmitted to a user device associated with a first user that indicates that het first parcel has been placed inside the first logistics vehicle.

20 Claims, 12 Drawing Sheets

(56) References Cited

U.S. PATENT DOCUMENTS

| | | | |
|---|---|---|---|
| 2014/0327521 A1* | 11/2014 | Chen | G06Q 10/087 |
| | | | 340/8.1 |
| 2017/0280351 A1* | 9/2017 | Skaaksrud | H04W 36/302 |
| 2018/0218320 A1* | 8/2018 | Lee | G06K 17/0022 |
| 2018/0365542 A1 | 12/2018 | Kantor et al. | |
| 2019/0303848 A1 | 10/2019 | Schoening | |
| 2021/0264154 A1 | 8/2021 | Lamont | |
| 2022/0306165 A1 | 9/2022 | Brown et al. | |
| 2023/0252399 A1 | 8/2023 | Khoche et al. | |

\* cited by examiner

| TAG ID | ASSET ID | ASSIGNED LOGISTIC VEHICLE |
|---|---|---|
| 1 | A | XJ5 |
| 2 | B | TZL |
| 3 | C | BFD |
| 4 | D | RQZ |

| READER DEVICE ID | LOGISTICS VEHICLE ID |
|---|---|
| 1 | TZL |
| 2 | BFD |
| 3 | ABC |

READER DEVICE TECHNOLOGY FOR DETERMINING THAT AN ASSET IS LOADED TO THE ASSIGNED LOGISTICS VEHICLE

CROSS-REFERENCE TO RELATED APPLICATION

This application is a continuation of U.S. patent application Ser. No. 18/091,763, filed Dec. 30, 2022, and entitled "READER DEVICE TECHNOLOGY FOR DETERMINING THAT AN ASSETS IS LOADED TO THE ASSIGNED LOGISTICS VEHICLE." The aforementioned application is expressly incorporated herein by reference in its entirety.

BACKGROUND

Managing the logistics of delivering a parcel is a complex process that requires common carriers to create and execute various steps in order to effectively and efficiently complete delivery. Before an asset (e.g., a package or parcel, a container, or bag of small items) reaches a final delivery destination, it typically goes through various operations. For instance, after a package has been dropped off at a carrier store for a delivery request, it may be routed to a hub or sorting facility. The package may traverse various different conveyor belt assemblies and go through different sorting processes in the hub based on information associated with the package (e.g., size of package, destination address, weight, etc.). After traversal of the package through the hub, a user may load the package into a logistics vehicle (e.g., a package car) for delivery to the final delivery destination or delivery to the next sorting phase operation.

Existing technologies for guiding the user to load an asset in the correctly assigned logistics vehicle and detecting whether an asset is inside the logistics vehicle have limited functionality or features, are inaccurate, negatively impact the user experience, and unnecessarily consume computing resources, among other technical problems. For example, carrier package scanning devices include components (e.g., a trigger mechanism) that require tedious manual user input, which causes likelihood of inaccuracies, among other technical problems. In another example, location-sensing technologies, such as Global Positioning System (GPS) technologies, are incapable of, or have difficulty with, detecting assets inside a logistics vehicle, among other technical problems.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Aspects herein are directed to a system that comprises at least one processor and one or more computer storage media storing computer-usable instructions. The computer processor performs a variety of operations. During the delivery process, the processor associates a first tag with a first item (e.g. parcel, packages, pallets, envelopes, etc.). The processor accesses, from computer storage, a data structure that indicates that the first parcel is assigned to be placed in a first logistics vehicle. An indication that a first device that is located inside a logistic vehicle has read data of the first tag is received. Based on accessing the data structure and receiving the first indication, whether the first parcel has been placed inside the first logistics vehicle is determined.

Some embodiments are directed to a computer-implemented method that comprises the following operations. A first tag is associated with a first parcel. Then, a data structure is accessed that indicates that the first parcel is assigned to be placed in a first logistics vehicle of a plurality of logistic vehicles. A first indication that a first device, located within the first logistics vehicle, has read the data of the first tag is received. It is determined that the first parcel has been placed inside the assigned first logistics vehicle. In response to determining that the first parcel has been placed inside the assigned first logistics vehicle, a first notification is transmitted to a user device associated with a first user. The first notification indicates that the first parcel has been placed inside the assigned first logistics vehicle.

Some embodiments are directed to a system that includes a first device coupled to a first unit, wherein the first device is configured to read the data of one or more tags coupled to one or more parcels. The system also includes a first processor and one or more computer storage media storing computer-usable instructions. The processor determiners whether the one or more parcels have been transported to a correctly assigned unit based at least in part on the first device reading the data of the one or more tags. Additionally, the processor in response to the determining, transmits, to a second device associated with the user, a notification indicating whether the one or more parcels has been transported to the correctly assigned unit.

BRIEF DESCRIPTION OF THE DRAWINGS

Figure 1:
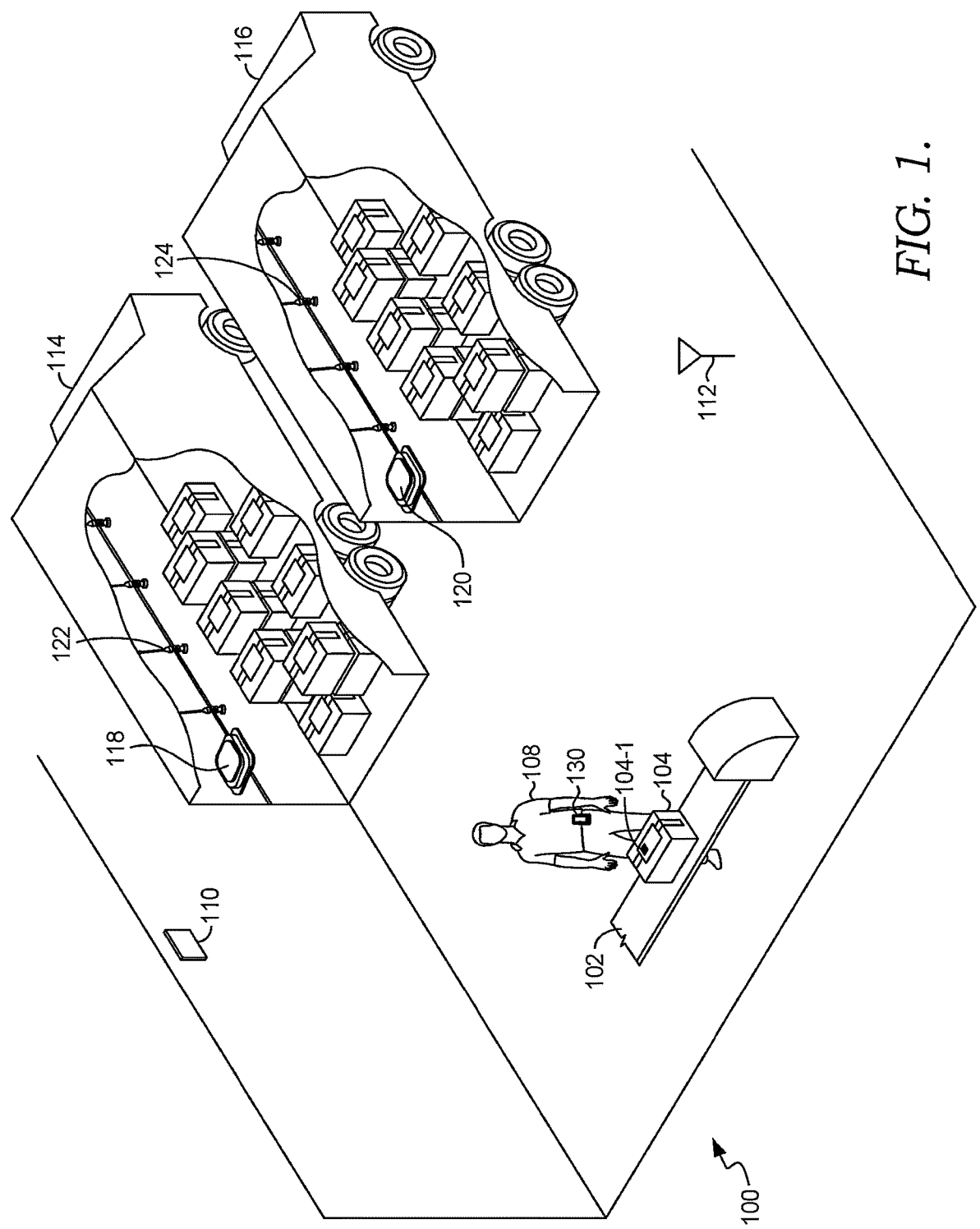
Figure 2:
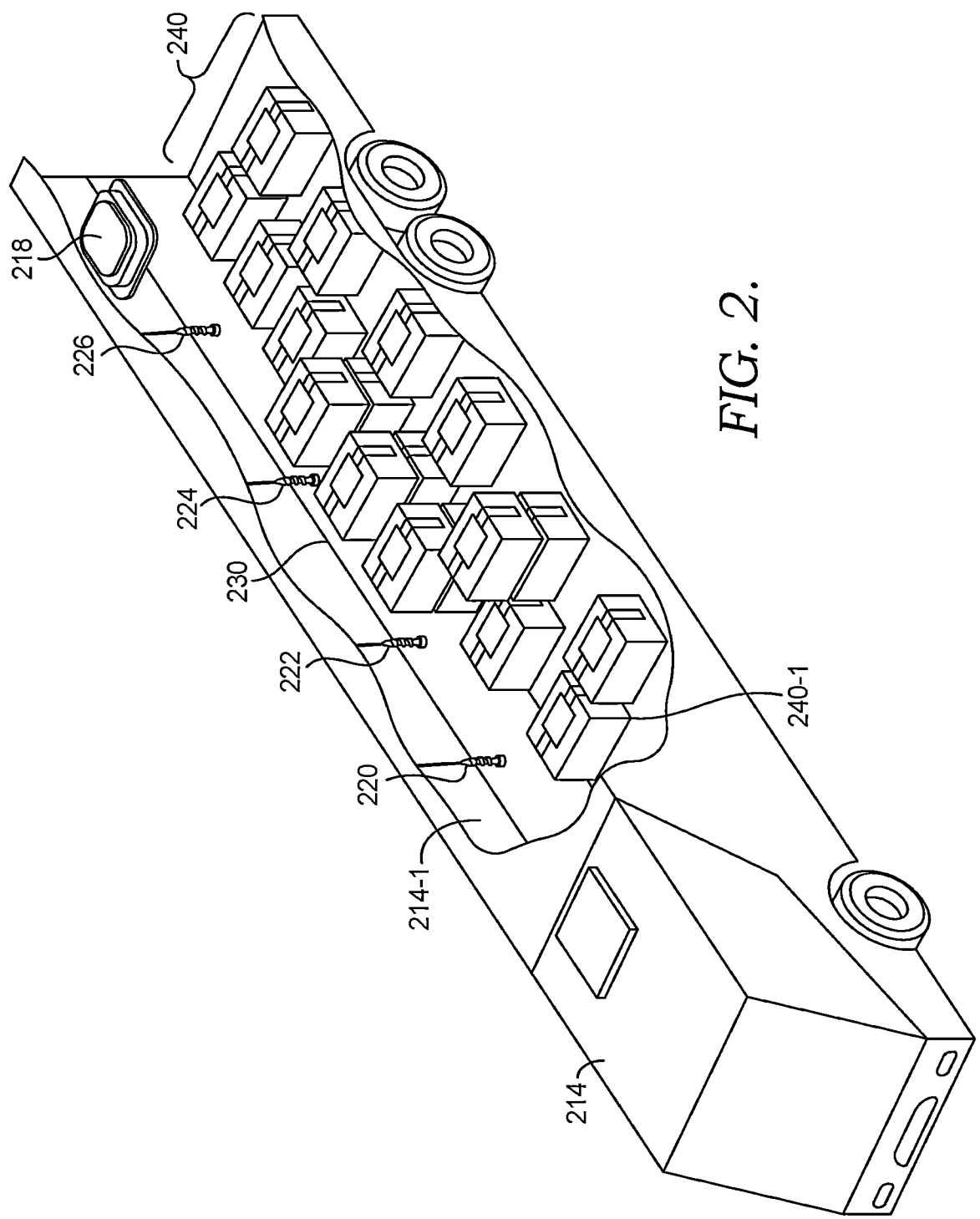
Figure 3:
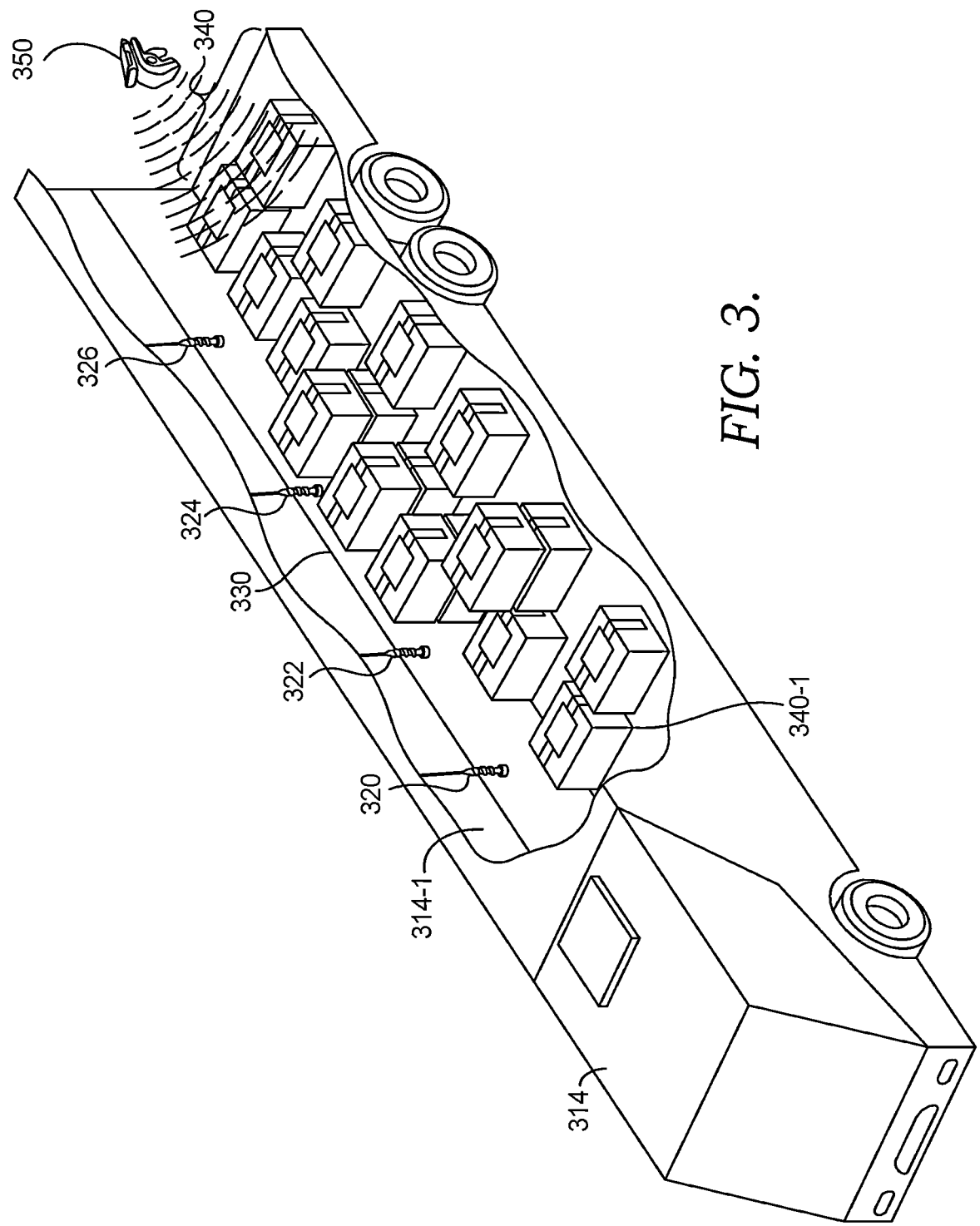
Figure 4:
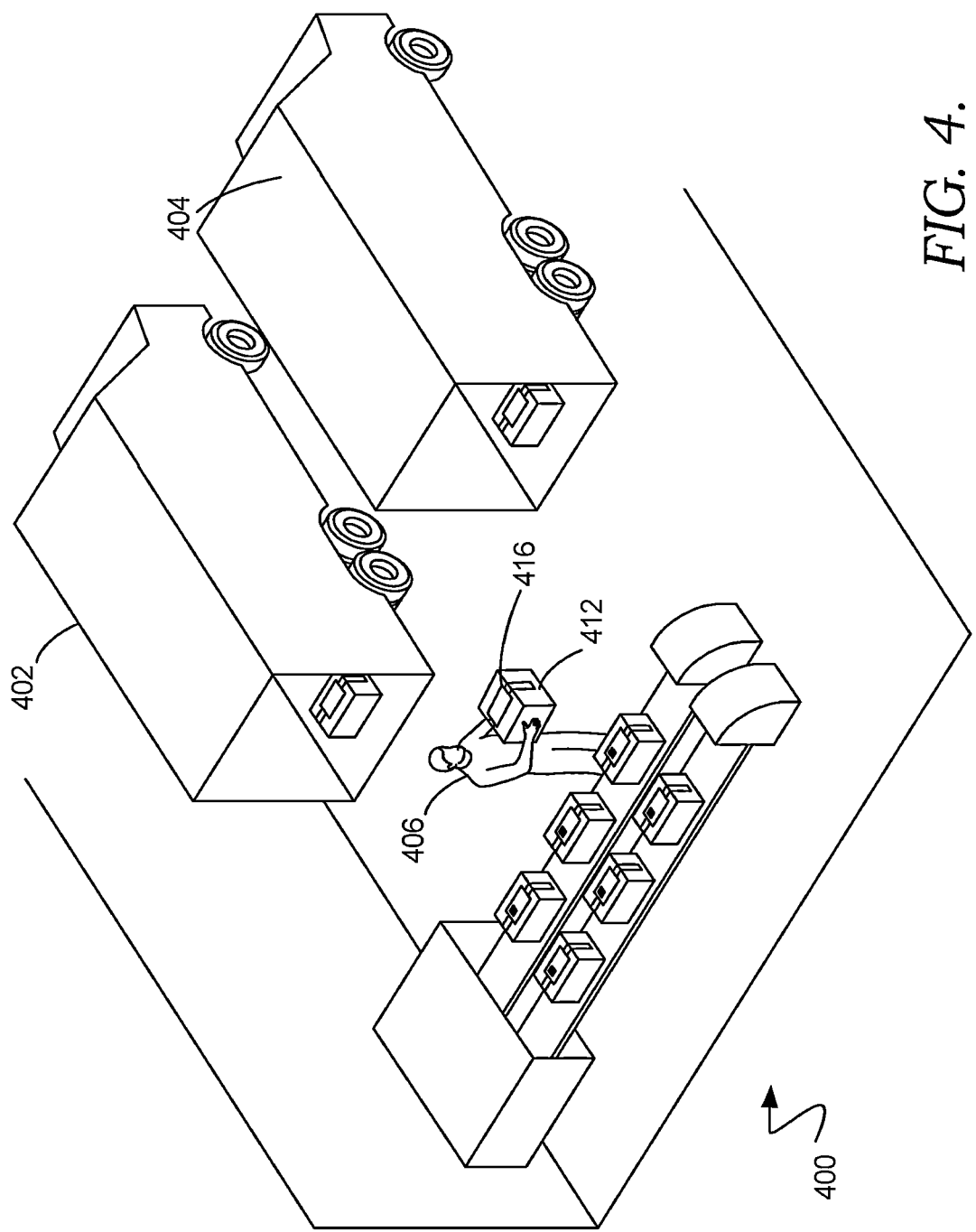
Figure 5:
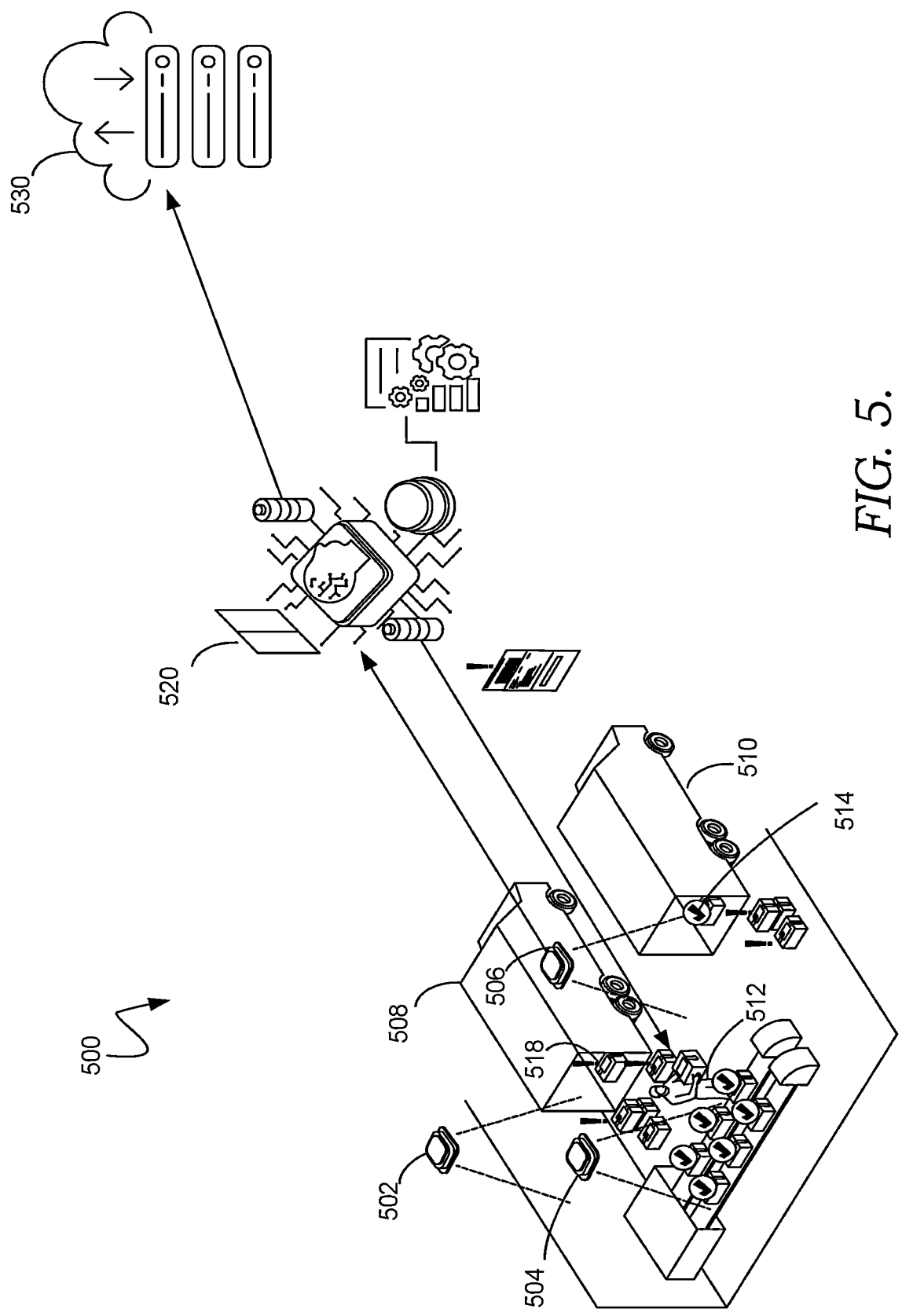
Figure 6:
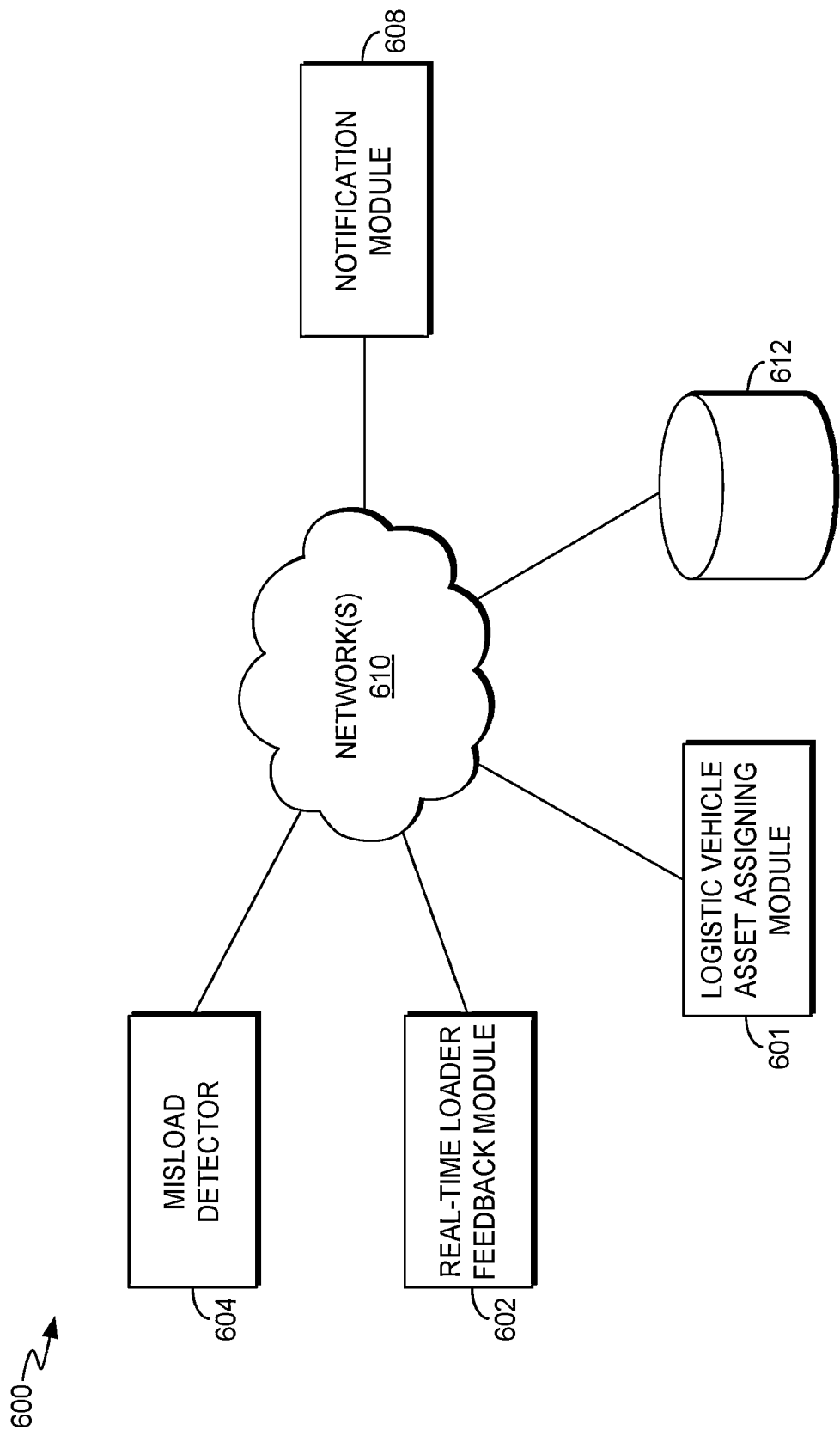
Figures 7, 8:
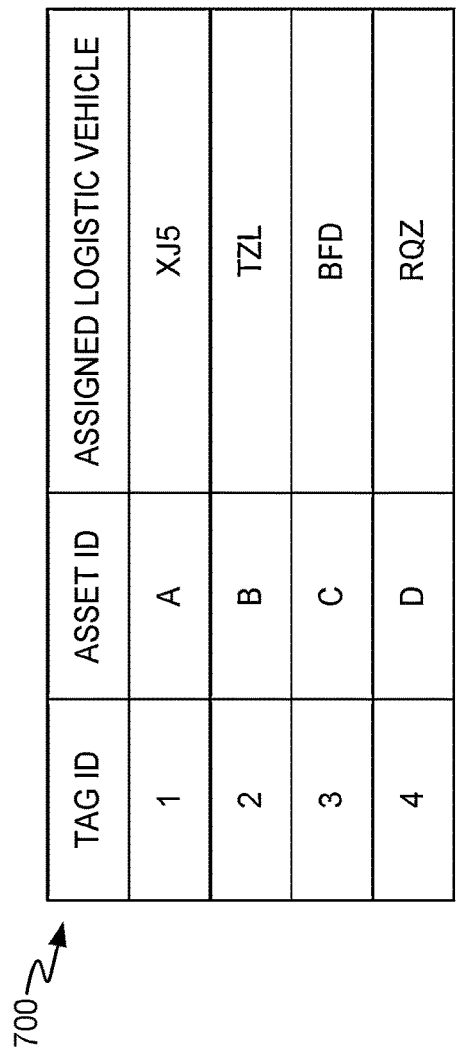
Figure 9:
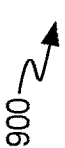
Figure 10:
Figure 11:
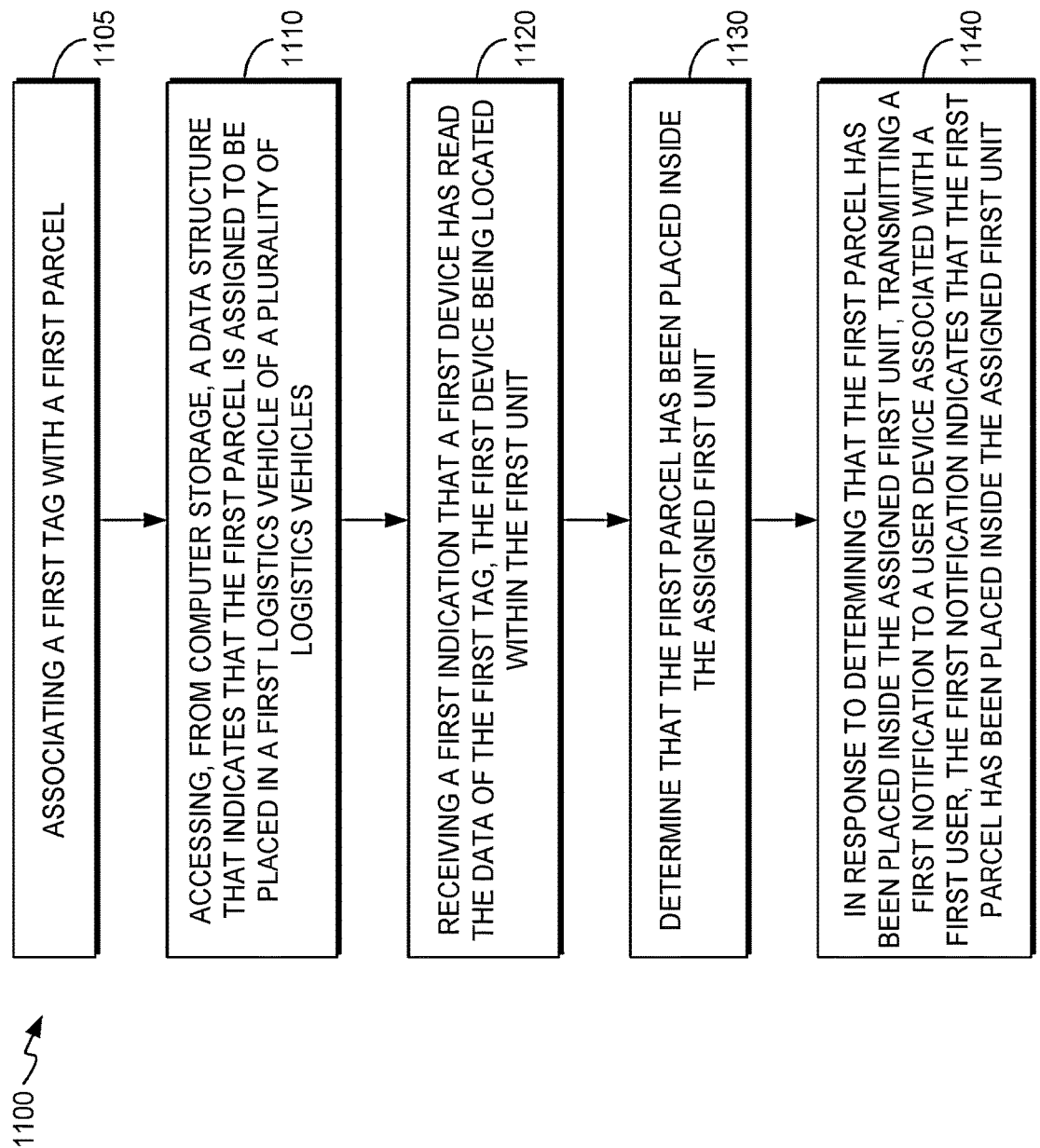
Figure 12:
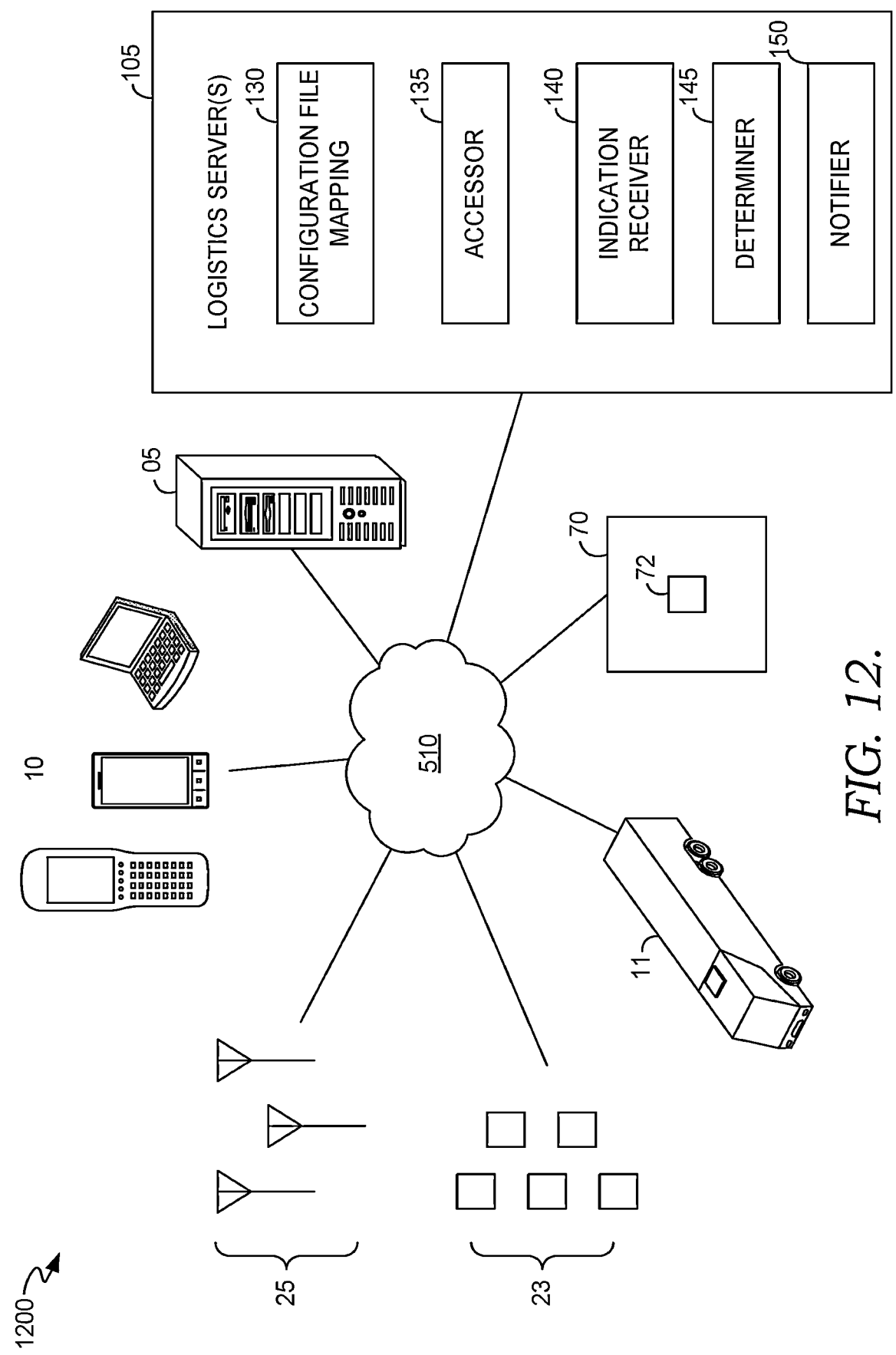
Figure 13:
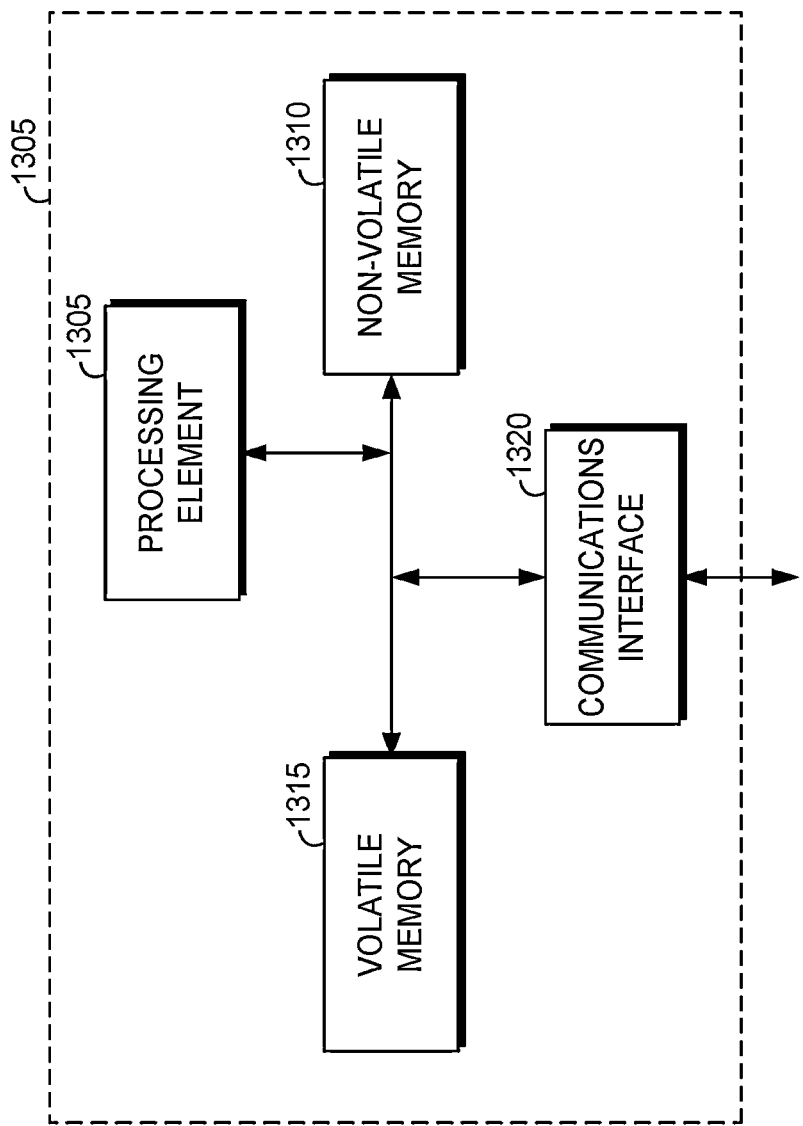
Figure 14:
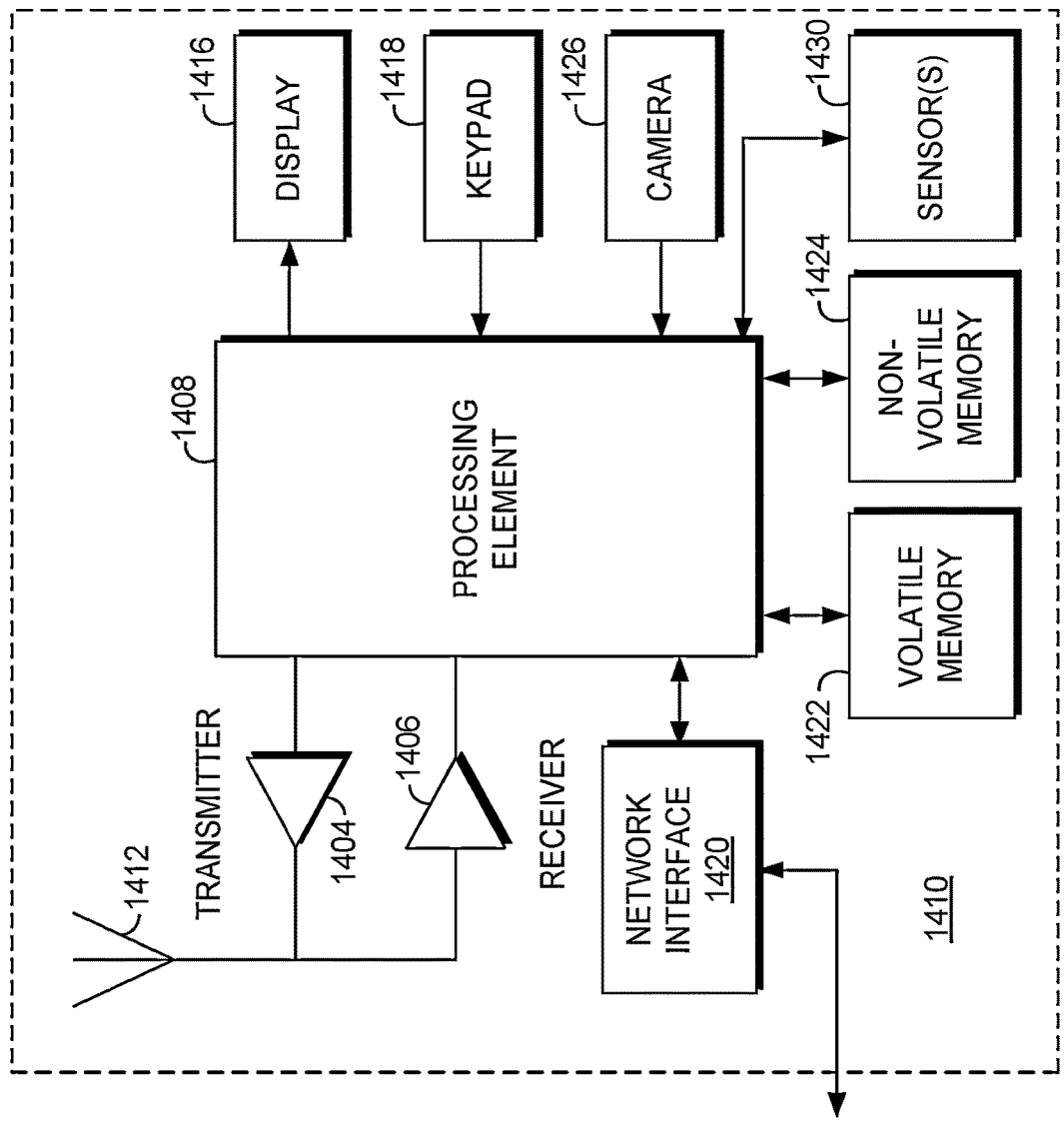

Having thus described the disclosure in general terms, reference will now be made to the accompanying drawings, which are not necessarily drawn to scale, and wherein:

FIG. 1 is a schematic diagram of an example environment for determining whether an asset is in a correctly assigned logistics vehicle or guiding a user to the correctly assigned logistics vehicle, according to some embodiments;

FIG. 2 is a schematic diagram of an example logistics vehicle, according to some embodiments;

FIG. 3 is a schematic diagram of another example logistics vehicle, according to some embodiments;

FIG. 4 is a schematic diagram of an example environment for determining whether an asset is in a correctly assigned logistics vehicle or guiding a user to the correctly assigned logistics vehicle, according to some embodiments;

FIG. 5 a schematic diagram of an example environment for determining whether an asset is in a correctly assigned logistics vehicle or guiding a user to the correctly assigned logistics vehicle, according to some embodiments of the disclosure;

FIG. 6 is a block diagram illustrating an example computing system architecture suitable for implementing embodiments of the disclosure;

FIG. 7 is a schematic diagram of an example data structure for mapping a tag ID to an assigned logistics vehicle, according to some embodiments;

FIG. 8 is a schematic diagram of an example data structure for mapping a reader device ID to a logistics vehicle ID, according to some embodiments;

FIG. 9 is a schematic diagram of an example data structure for mapping a reference tag ID to a logistics vehicle ID, according to some embodiments;

FIG. 10 is a schematic diagram of an example data structure for mapping a reader device ID and/or a tag ID to a geographical ID, according to some embodiments;

FIG. 11 is a flow diagram of an example process for determining whether an asset is inside a logistics vehicle, according to some embodiments;

FIG. 12 is a schematic diagram of an example computing environment in which aspects of the present disclosure are employed in, according to some embodiments;

FIG. 13 is a schematic diagram of one or more logistics server(s) in which aspects of the present disclosure are employed in, according to some embodiments; and FIG. 14 is a schematic diagram of a computing entity in which aspects of the present disclosure are employed in, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

In the shipping industry, before an asset (e.g., a package, parcel, container, bag of small items, etc.) reaches a final delivery destination, it typically goes through various operations. For instance, after a package has been dropped off at a carrier store for a delivery request, it may be routed to a sorting facility where the package traverses various different conveyor belt assemblies and processes in the sorting facility based on information associated with the package (e.g., size of package, destination address, weight, etc.). After traversal of the package through the sorting center, the package may be loaded into a logistics vehicle for delivery to the final delivery destination or delivery to the next sorting phase operation. Sometimes assets become lost or need to be tracked at the carrier store, the sorting facility, and/or in the delivery vehicle itself. For example, a package may have been misplaced by a clerk at a logistics store, a package may have fallen off a conveyor belt assembly in a sorting facility, and a package may have been accidentally placed in an incorrect logistics vehicle, or otherwise may need to be found. Assets or packages may need to be located in other contexts or industries as well, such as finding items in warehouses for a particular retailer in the retailing industry, finding items in a storage room for an individual or entity, or finding any suitable asset in any suitable geographical location or corresponding structure (e.g., a building or dwelling) for any purpose. Location sensing technology may be used to help find these lost assets.

Currently, existing carrier package scanning device systems are used to associate an asset to a logistics vehicle to determine what logistics vehicle the package is to be placed in. Carrier package scanning device systems have many technical problems in associating an asset to a correctly assigned logistics vehicle. Carrier package scanning devices typically require users to manually point a carrier package scanning device at a shipping label. They also typically include a mechanical trigger that, upon user decompression, activates a 2D imager (e.g., a photodiode) to read a bar code located on the shipping label and convert it into an electrical signal. Decoders of the carrier package scanning device further typically take the binary code read by the 2D imager and convert it to usable information, such as a natural language tracking number, a package identifier, or other information.

For each package a user is loading in each particular logistics vehicle, the user is typically required to manually scan each package and then provide manual computer user input associating each package to the logistics vehicle. However, due to the sheer quantity of times these carrier package scanning device technologies require manual user input, there is an increase in the likelihood that a package will be mapped (e.g., via a data structure) or assigned to the incorrect logistics vehicle, thereby increasing the likelihood of inaccuracies.

Moreover, previous carrier package scanning device systems lack particular functionality and features. For example, the package scanning devices do not automatically scan packages, and these systems do not employ alert features or functionality for indicating whether the user has placed an asset into the correct assigned logistics vehicle (or whether the user is currently heading towards the correct assigned logistics vehicle).

Moreover, these carrier package scanning technologies unnecessarily consume computing resources. As stated above, for each package a user is loading in each particular logistics vehicle, the user is typically required to manually scan each package and then provide manual computer user input associating each package to the logistics vehicle. However, such manual computer user input increases storage device input/output (I/O), packet generation/network, costs, and the like. For example, manual data entry in these systems increase storage device I/O (e.g., excess physical read/write head movements on non-volatile disk). This is because each time a user inputs this information (because the user has to associate each package, of multiple packages, with the logistics vehicle), the computing system has to traverse a network and reach out to a storage device to perform a read or write operation. This is time consuming, error prone, and wears on components, such as a read/write head. Reaching out to disk is also very expensive because of the address location identification time and mechanical movements required of a read/write head.

Location-sensing technologies, such as Global Positioning System (GPS) technologies, are incapable of, or have difficulty with, detecting assets inside a logistics vehicle, among other technical problems. The proliferation of wireless technologies, mobile computing devices, apps, and the Internet has fostered a growing interest in location-aware technologies. These technologies can locate objects using techniques such as Global Position System (GPS) triangulation or the like. Typical location-sensing technologies include static components or are limited in functionality. This can cause, among other things, inaccurate determination of whether assets are located in a logistics vehicle.

In an illustrative example, although some conventional solutions use tracking technologies, such as Global Positioning Systems (GPS) to track items, they have an inherent problem of accurately determining locations of objects inside logistics vehicles or other enclosed areas. In most indoor cases, GPS signals will be blocked or reflected by walls and have difficulty entering an enclosed area. As a result, satellite signals cannot be received properly, so it may be impossible or difficult to calculate location due to the insufficient signal strength inside the enclosed area.

To resolve these issues, particular indoor location-sensing technologies have been developed. For example, certain infrared indoor location technologies use diffuse infrared technology to realize indoor location positioning. However, the line-of-sight requirement and short-range signal transmission are two limitations that suggest it to be less than effective in practice for indoor location sensing. Ideally, wireless communication between devices occurs via a line-of-sight path (i.e., waves travel in a direct path) between transmitter and receiver that represents clear spatial channel characteristics. However, with these existing technologies, communications would not occur via a line-of-site path because of physical barriers or other interference obstacles in a logistics vehicle (e.g., multiple packages, shelves, a person walking in the logistics vehicle, etc.) between transmitter and receiver. This can cause reflection, attenuation (or fading), phase shift, and/or distortion (e.g., due to noise) of the signals among other things, thereby reducing performance, such as communication between devices based on reduced signal strength.

Various embodiments of the present disclosure provide one or more technical solutions to one or more of these technical problems described above. In operation, some embodiments include a first reader device. For example, in some embodiments, an automated Radio Frequency Identification (RFID) reader is located within a delivery vehicle. Such first reader device is configured to automatically read data of one or more tags (e.g., RFID tags) coupled to one or more assets. In this way, as assets are loaded onto a delivery vehicle, particular embodiments can detect whether the asset has been placed into the vehicle via a read, by the first reader device, of data from the tag coupled to the asset. Additionally, particular embodiments detect whether there has been a misload (e.g., a placement of a parcel inside a non-assigned vehicle) and can then transmit a notification to a first user device to indicate the misload information so that the parcel can be placed inside the correctly assigned vehicle. In aspects, there may be multiple reading devices, antennas, and/or reference tags located within and outside the delivery vehicle. For example, additional reading devices may be located within a warehouse so that as packages are being transported through the logistics system of the carrier, the asset can be tracked closely. This allows for more prompt detection of an asset being located in the incorrect location and the ability to confirm that an asset assigned to a specific delivery vehicle is indeed en route to that vehicle.

A reader device may be coupled to an interior volume of space (e.g., within a package car or inside a building a user is in). The reader device is configured to also read the data of the one or more tags coupled to the one or more assets. For example, the reader device may be coupled to an inside of the logistics vehicle, such that when a first tag coupled to an asset comes within a distance, communication range, or signal strength (e.g., RSSI) threshold of the reader device or antenna of the reader device (based on the loader loading the asset into the logistics vehicle), the second reader device reads the data of the tag.

Some embodiments additionally or alternatively include one or more reference tags coupled to the interior volume of space. For example, multiple reference tags may also be coupled to an inside portion of the logistic vehicle, such that when the reader device within the logistics vehicle comes within a distance, communication range, or signal strength threshold of the tag on the asset (based on the loader loading an asset into the logistics vehicle), the reader device reads the data of the tag. Additionally, the same reader device can read the data from the reference tags and perform a quick and dirty trilateration of the position of the asset tag by comparing signal strength characteristics between the reader and asset tag and the reader and reference tags. The closer in proximity an asset tag is to a reference tag, the signal strength between the reference tag and the reader device will likely be similar or identical to the signal strength between the asset tag and the reader device. Likewise, the farther away the asset tag is to the reference tag, the signal strength between the reference tag and the reader device will likely be different over a threshold to the signal strength of the asset tag and the reader device.

Some embodiments include a computing device (e.g., a remote server) that is configured to perform various operations. For example, in some embodiments, the computing device is configured to determine or detect whether a parcel is inside a correctly assigned logistics vehicle based on a reader device receiving data from a tag coupled to an asset or the reader device reading data from a reference tag coupled to an interior portion of the logistics vehicle. In some embodiments, in response to such determination, the computing device is configured to transmit, to a device (e.g., a mobile smartphone) associated with the user, a notification indicating whether the first parcel is inside the correctly assigned vehicle. Some embodiments additionally or alternatively provide one or more near-real time notifications or instructions that guide the user to the correctly assigned logistics vehicle in response to the reader device reading data from a tag, as described in more detail below.

Particular embodiments improve package scanning device systems. For example, particular embodiments improve the user experience, human-computer interaction, and accuracy. For example, for each of 50 packages a user is to load in a first package car, the reader device located within a logistics vehicle automatically reads a respective tag coupled to each package in response to an antenna of the reader device and tag being within a signal strength, communication range, or distance threshold. Therefore, one technical solution is that the reader device is configured to automatically read the data from the tag, instead of requiring a manual pointing and decompression of a trigger.

Another technical solution is that particular embodiments automatically access a data structure that indicates that a parcel is assigned to be placed in a particular logistics vehicle. Accordingly, because these embodiments significantly reduce manual user input or automatically call a data structure (e.g., a lookup table), there is an increase in the likelihood that a package will be mapped or assigned to the correct logistics vehicle, thereby increasing the likelihood that the data structure will map the package to the correct logistics vehicle. Accordingly, reader devices positively impact the user experience and human-computer interaction, as the reader device performs its functionality automatically, which is more simple, less tedious, and less arduous relative to carrier package scanning devices.

One technical solution is the functionality of determining whether an asset is inside a correctly assigned logistics vehicle based at least in part on a reader device (e.g., inside a logistics vehicle or environment) having read data from a tag of an asset. No existing carrier package scanning devices or location-based technologies currently perform this functionality. Other technical solutions are determining whether a user has transported a parcel to a logistics vehicle and/or providing near real-time feedback that guides the user to the logistics vehicle based on receiving an indication that a reader device inside a logistics vehicle has read data from a tag Currently, no other existing solutions perform this functionality.

Moreover, particular embodiments improve computing resource consumption relative to existing carrier package scanning technologies. As stated above, for each package a user has to load in each particular logistics vehicle, the user is typically required to manually scan each package and then provide manual computer user input associating each package to the logistics vehicle. However, as described above, particular embodiments do not require such manual computer user input. Therefore, there is a reduction in storage device input/output (I/O), packet generation/network, costs, and the like. For example, automatically accessing and reading a data structure that indicates that a parcel is assigned to be placed in a particular logistics vehicle in response to a reader device located in a logistics vehicle reading a corresponding tag reduces storage device I/O (e.g., excess physical read/write head movements on non-volatile disk). This is because the user does not have to manually associate a package with the logistics vehicle (e.g., via a spreadsheet), such as by putting in the name of the package, the name of the vehicle, destination, and the like. Accordingly, the computing system does not have to traverse a network and reach out to a storage device to perform a read or write operation. Therefore, embodiments are less error prone, and wears less on components, such as a read/write head due to the reduced mechanical movements.

Particular embodiments also improve location-sensing technologies, such as Global Positioning System (GPS) technologies, because they are capable of or are accurate in detecting assets inside a logistics vehicle. One technical solution is one or more reader devices, antennas, or reference tags coupled to an inside housing of a logistics vehicle. Another technical solution is one or more reader devices, antennas, or reference tags coupled to an environment (e.g., hub walls) a user is in, which is outside the logistics vehicle. Accordingly, because these devices are coupled to an inside housing or an environment the user is in, the signals have less chance of being blocked or reflected by walls and have less difficulty entering an enclosed area, unlike GPS signals. As a result, there is sufficient signal strength between tags an readers inside the enclosed area, thereby allowing embodiments to accurately detect whether assets are in particular vehicles based on the unfettered communication and signal strength between antennas of readers and tags.

Some embodiments improve technologies, such as Active badge, via the use of RFID tags and RFID readers. RFID does not have strict line-of-sight requirements. Further, some embodiments improve existing technologies via the use of multiple "reference" tags and/or reader devices inside a logistics vehicle or environment that the user is in. In this way, even if communications does not occur via a line-of-site path because of physical barriers or other interference obstacles in a logistics vehicle between a single reader device and tag, there are other tags or readers in differing positions to avoid line-of-site issues. This reduces reflection, attenuation (or fading), phase shift, and/or distortion (e.g., due to noise) of the signals among other things, thereby increasing performance, such as signal strength. Using this new infrastructure setup, some embodiments can perform new functionality by detecting whether an asset is in a particular logistics vehicle based on the proportion of tags mapped to a storage device that are currently being read by a reader device.

Employing multiple readers and/or tags in fixed locations in different geographical areas and/or within logistics vehicles allows for redundancy checks, which improves existing technologies. The benefit of redundancy in these embodiments is that there may be multiple tags and/or readers in near positions such that any interference or noise experienced at one tag and/or reader location does not typically affect sensor readings of all of the other tags/readers. Employing multiple tags and/or readers at different locations increases the likelihood that not all reader/tag pairs will be subject to the same interference or noise at the same time, thereby allowing more accurate sensors readings for location sensing of asset tags.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to identify key features or essential features of the claimed subject matter, key improvements, nor is it intended to be used in isolation as an aid in determining the scope of the claimed subject matter.

II. Example Environment

FIG. 1 is a schematic diagram of an example environment for determining whether an asset is in a correctly assigned logistics vehicle or guiding a user to the correctly assigned logistics vehicle, according to some embodiments. The environment 100 includes a conveyor apparatus 102, a package 104 (which includes a tag 104-1), a loading user 108 that is carrying a mobile device 130 (e.g., a smart phone), one or more reference tags 110, one or more readers 112, and two logistics vehicles 114 and 116, each of which has one or more corresponding reference tags and/or readers.

In some embodiments, a "reader device" as described herein is any suitable reader machine, manufacture, or module that is configured to read data (e.g., a tag ID) stored to a tag. For example, a reader device can be Radio Frequency Identification (RFID) reader, a Near-field Communication (NFC) reader, an optical scanner, an optical reader, a bar code scanner, a magnetic ink character recognition reader, a beacon reader, or the like. In some embodiments, a "tag" as described herein is any physical object that stores, at minimum, an identifier that identifies the tag. The identifier (and potentially other data) is configured to be read by a reader device. For example, in some embodiments, a RFID tag includes an antenna or radio (for transmitting and receiving its tag ID) and a RFID chip (e.g., an integrated circuit), which store's the tag's ID and other information. In another example, a tag is or includes a paper label with a matrix or barcode with an encoded ID.

In some embodiments, any reader device or tag combination described herein is part of a Radio Frequency Identification (RFID) system. Accordingly, these components may include the components and functionality of RFID tags and readers. RFID is a way to store and retrieve data through electromagnetic transmission to an RF compatible integrated circuit. An RFID reader device can read data emitted from or located within RFID tags. RFID readers and tags used a defined radio frequency and protocol to transmit or provide (via tags) and receive (via reader devices) data. RFID tags are categorized as at least passive or active. Passive RFID tags operate without a battery. They reflect the RF signal transmitted to them from a reader device and add information by modulating the reflected signal. Their read ranges are limited relative to active tags. Active tags contain both a radio transceiver and a battery to power the transceiver. Since there is an onboard radio on the tag, active tags have more range than passive tags. It is noted however, that the reader devices or tags need not be a part of RFID protocols, but can alternatively or additionally include other protocols, such as BLUETOOTH LOW ENERGY (BLE), Bar codes, QR codes, and the like.

In some embodiments, a "conveyor apparatus" as described herein, such as conveyor apparatus 102, includes any suitable conveyor belt assembly that includes a conveyor belt (continuous medium that carries parcels from one location to another) one or more rollers or idlers that rotate the belt or rotate such that the parcels are moved, and/or one or more pulleys (e.g., located on the ends of the conveyor apparatus 102) that transmit drive power into the belt. A conveyor apparatus, however, need not require a "belt" but can use rollers or other mechanisms to move parcels. The conveyor apparatus 102 may include a rotating component (e.g., a belt or set of rollers) that is configured to cause movement of one or more assets for loading the one or more assets.

Continuing with FIG. 1, at a first time, in response to an antenna of the reader device 112 being within a signal (e.g., RSSI) strength threshold, communication capability threshold (e.g., the ability of the antenna to receive a signal from a tag), and/or distance threshold of the tag 104-1 (indicative of the loader 108 approaching the asset 104 to pick it up or the conveyor 102 pushing the asset 104 close to the loader 108), the device 118 reads data from the tag 104-1. In some embodiments, in response to the reader device 118 reading the data from the tag 104, some embodiments access, over a computer network, a data structure that indicates that the parcel 104 is assigned to be placed inside the logistics vehicle 114 (and not the logistics vehicle 116). For example, in some embodiments, this includes receiving a tag ID from the tag 104-1 in response to the reading and then calling a lookup table data structure to map the tag ID to the package (i.e., 104) it is coupled to and then looking up the same or different data structure (e.g., a helper data structure) to map the package ID to the vehicle ID that the package 104 is supposed to be loaded in.

In response to such mapping and access of the data structure(s), some embodiments, guide the loader 108 to the logistics vehicle 114 via the mobile device 130. For example, some embodiments open a communication channel with loader 108's mobile device 130 (by mapping, via a data structure, the ID of the reader device 106 to an IP or MAC address of the mobile device 130) and cause a notification to be displayed, which displays an identifier identifying the correct logistics vehicle 114 that the loader 108 is supposed to load the package 104 into and/or an electronic map illustrating where the logistics vehicle 114 is.

Some embodiments provide near real-time feedback to the mobile device 130 to guide the operator 108 to the logistics vehicle 114 via the reader device 130, the reference tag(s) 110, the reader(s) 112, the reference tag(s) 112, the reader device 118, the reference tag(s) 124, and/or the reader device 120. For example, indications that a subset of specific reader devices 112 are reading data from the tag 104-1 can indicate that the tag 104-1 is located in a particular geographical area (e.g., a particular room or section of a building) based on a predefined mapping data structure that associates each reader device with a room. The tag(s) 110 and/or reader device(s) 112 are placed in any suitable physical environment, geographical area, and/or apparatus (e.g., the conveyor 102) within such physical environment or geographical area. The tag(s) 110 and/or the reader device(s) 112 can be coupled to or placed in any suitable location, such as on the ceiling of a building in a hub, on the floor of the building, on the walls of a building, and/or any structure, position, or orientation within a geographical area. Responsively, particular embodiments can infer that the loader 108, for example, is in the corresponding environment and is heading toward the correct logistics vehicle 114. Responsively, particular embodiments, for example, cause display of feedback to the mobile device 130, such as "keep walking in that direction," or "move south immediately, you are heading towards the wrong logistics vehicle."

Some embodiments additionally determine or detect whether the package 104 is inside the logistics vehicle 114 and/or 116 via the use of reader device 130, the tag 104-1, the reference tag(s) 122, the reader device 118, and the reference tags 122 and 124, and/or the reader device 120. For example, in response to receiving an indication that the reader device 118 is within a signal strength, communication range, and/or distance threshold to the tag 104-1, the reader device 118 reads data from the tag 104-1. In response to receiving an indication of this read, or the receipt of the tag ID of 104-1, particular embodiments detect that the package 104 is inside the logistics vehicle 114 (since the package 104 is mapped, via a data structure, to the ID of the tag 104-1) and store, in computer memory or as a data record (e.g., a database row), data indicating that such package 104 has been loaded into the correct logistics vehicle 114.

In some embodiments, the reference tag(s) 122 is additionally or alternatively used to make the same inference that the package 104 is located inside the logistics vehicle 114. For example, in response to the reader device 130 being within a signal strength, communication capability, and/or distance threshold to the tag(s) 122 (presumably because the loader 108 has loaded or is inside the logistics vehicle 114 loading the package 104), the reader device 130 reads data from the tag 104-1. In response to receiving an indication of this read of the tag ID(s) of 122, particular embodiments detect that the package 104 is inside the logistics vehicle 114 (since the tag(s) 122 are mapped, via a data structure, to the logistics vehicle 114, data indicating that such package 104 has been loaded into the correct logistics vehicle 114).

In some instances, the reader device 130 will read data from some of the reference tags 122 and 124 inside both logistics vehicles 114 and 116 (and/or some of the tag(s) 110). In these instances, some embodiments perform an arithmetic algorithm to detect the quantity of reads of both logistics vehicles (or other areas outside of the logistics vehicles), compare the quantities, and the logistics vehicle (or area) with the highest quantity of tag reads is predicted to be the logistics vehicle (or area) that the package 104 is located in. For example, the reader device 130 may read 10 tags inside the logistics vehicle 114, but only 5 tags inside the logistics vehicle 116. Because 10 is higher than 5, the package is predicted to be located in the logistics vehicle 114. In some embodiments, signal strength between the device 130 and the tags(s) 122 and 124 is alternatively or additionally used. In these embodiments, the signal strength is compared between readings of each vehicle and it is predicted that the package 104 is inside a particular logistics vehicle based on the highest signal strength between the reader device 130 and the respective tag(s) 122 and 124 of the respective vehicles 114 and 116.

In a similar situation, in some instances, the reader devices 118 and 120 (and/or 112) will both read the data from the tag 104-1. In these instances, some embodiments perform arithmetic to detect the quantity of reads of both logistics vehicles, compare the quantities, and the logistics vehicle with the highest quantity of tag reads is predicted to be the logistics vehicle that the package 104 is located in. For example, the logistics vehicle 114 may have 10 reader devices 118 that read the tag 104-1, whereas the logistics vehicle 116 has 5 reader devices 120 that read the tag 104-1. Because 10 is higher than 5, the package 104 is predicted to be located in the logistics vehicle 114. In some embodiments, signal strength between the reader device 118 and reader device 120 and the tags 104-1 is alternatively or additionally used. In these embodiments, the signal strength is compared between readings of each vehicle and it is predicted that the package 104 is inside a particular logistics vehicle based on the highest signal strength between the reader device 118 and tag 104-1 and the reader device 120 and the tag 104-1.

In order to determine the package's location, scanning data (e.g., signal strength values) is extracted between each of the environments tags 112 and the reader device 118 and 120. Based on the signal strengths values, it is determined whether the asset tag 104-1 is relatively close or farther away from a particular antenna of a reader device (e.g., 118) relative to the distance between other antennas of other reader devices (e.g., 122).

As has been described herein, particular embodiments generate and derive one or more data structures that provide mappings in order to know which reader devices and/or tags belong to which environment (e.g., specific geo-coordinates in a hub or in a specific logistics vehicle). Such data structures can additionally provide mappings in order to know which user devices (e.g., mobile device 130) belong to which users, and which packages are coupled to which tags. Such data structures can be or include any suitable data structure, such as a lookup table, a hash map, a list, or the like. In an illustrative example, a lookup table or hash map may include a key column that lists each ID of each logistics vehicle. And for each ID, there is a list of other tag IDs representing each tag that is coupled to a particular logistics vehicle.

IV. Example Logistics Vehicle

FIG. 2 is a schematic diagram of an example logistics vehicle 214, according to some embodiments. In some embodiments, the logistics vehicle 214 represents the logistics vehicle 114 or 116 of FIG. 1. As such, for example, in some embodiments, the RFID reader 218 (and/or each of the antennas 220, 222, 224, and 226) represents the reader device 118 of FIG. 1. As illustrated in FIG. 2, the logistics vehicle 214 includes the array of assets or parcels 240 (including asset 240-1), the RFID reader device 218 coupled to (or build within) the sidewall 314 of the sidewall 214-1, and four antennas—220, 222, 224, and 226—that are coupled to each other and the RFID reader device 218 via the common bus or communications link 230. The communications link 230 is a wired connection coupled to (or build within) a sidewall 214-1 of the logistics vehicle 214 and connects to each of the RFID antennas 220, 222, 224, and 226 so as to relay to readings to or from the RFID reader 218.

In some embodiments, one or more RFID antennas (e.g., RFID antenna 220) is a transceiver that is configured to both interrogate, by transmitting a signal to, one or more tags located with the asset array 240 and responsively receive, from a corresponding tag coupled to a respective asset, a corresponding tag ID. In some embodiments, however, one or more RFID antennas is only a receiver, which is configured to passively receive (and not transmit) RFID tag IDs from respective tags.

The RFID reader device 218 is configured to receive, via the communications link 230 and from each of the antennas 220, 222, 224, and 226, a respective RFID tag ID and then read or decode such tag ID. For example, in response to the antenna 220 being within a distance threshold to the package 240-1, the tag coupled to the package 240-1 transmits, via a separate antenna, its ID to the RFID antenna 220. The RFID antenna 220 responsively transmits the tag ID through the communications link 230 to the RFID reader device 218, which then reads or decodes the tag ID.

As illustrated in FIG. 2, there are multiple antennas 220, 222, 224, and 226 that are evenly spaced out within the logistics vehicle 214 such that the RFID reader device 218 is able to capture signals from a tag coupled to an asset located in any position within the logistics vehicle 214. In other words, in some embodiments, any one given antenna has a transmitting and/or receiving range capacity relative to its specific position. For example, the antenna 226 may only be able to transmit an interrogation signal to areas that include the half of the logistics vehicle 214 that the antenna 226 is located in. Accordingly, the antenna 226 may not be able to transmit a signal to a tag coupled to the package 240-1. Therefore, particular embodiments additionally provide antennas 220, 222, and/or 224 so as to provide a greater transmission and/or receiving range for a wider lens of visualization within the logistics vehicle 214.

In some embodiments, in response to the RFID reader device 218 decoding or reading each tag ID derived from a corresponding antenna, such as 220, the RFID reader device 218 transmits (e.g., via the antenna 226), over a network, the tag ID and its own ID, to a central server or other device (e.g., a cloud computing node), which then associates the tag ID to the corresponding package and the logistics vehicle that the RFID reader device 218 is in. For example, a server may perform a lookup, at a data structure, of the RFID reader device 218 ID (a key in a key-value pair structure) to map its ID to an ID (a value in the key-value pair structure) of a logistics vehicle it belongs in. The server may additionally map the received tag ID to a corresponding package. Based on these mappings, the server infers that the package 240-1, for example, is located within the logistics vehicle 214. It is understood, however, that in some embodiments, such backend server functionality is alternatively performed at the RFID reader device 218 itself or other computing device local to or within the logistics vehicle 214.

FIG. 3 is a schematic diagram of another example logistics vehicle 314, according to some embodiments. In some embodiments, the logistics vehicle 314 represents the logistics vehicle 114 or 116 of FIG. 1. As illustrated in FIG. 3, the logistics vehicle 314 includes the array of assets or parcels 340 (including asset 340-1), four antennas—320, 322, 324, and 326—that are coupled to each other and the RFID reader device 350 via the common bus or communications link 230, and a mounted device 350. In some embodiments, the mounted device 350 is a wand. A wand is an optical reader that is configured to read barcodes or other machine-readable indicia (e.g., QR codes or matrix code) and/or natural language (e.g., via Optical Character Recognition (OCR)). Wands typically capture package information on a package label, such as addresses, names, tracking numbers, In some embodiments, the mounted device 350 is configured to automatically propagate a signal and responsively receive and read data from each label of each asset that is within a communication range. In this way, it can be determined whether a corresponding asset is in a particular logistics vehicle. For example, the mounted device, being a wand, may receive package level information, such as destination address, originating address, and shipping entity. After decoding such information, the wand transmits, over a network, its ID, as well as the package level information. Responsively, a server maps the wand ID to an ID of the vehicle it is located in—314. The server additionally maps the package level information to a particular asset ID and then maps the asset ID to the logistics vehicle ID that the asset is assigned to be transported in. Responsively, a misload detector determines whether the corresponding asset is within the correctly assigned logistics vehicle. In some embodiments, the mounted device 350 is additionally or alternatively configured to receive RFID tag ID by transmitting a signal which detects the tags coupled to each package, such as package 340-1. The mounted device 350 reads or decodes the tag ID detected.

In some embodiments, in response to the mounted device 350 may decode or reading each tag ID derived from a corresponding antenna, such as 320, the RFID reader device transmits (e.g., via the antenna 326), over a network, the tag ID and its own ID, to a central server or other device (e.g., a cloud computing node), which then associates the tag ID to the corresponding package and the logistics vehicle that the device 350 is located at. For example, a server may perform a lookup, at a data structure, of the device 350 ID (a key in a key-value pair structure) to map its ID to an ID (a value in the key-value pair structure) of a logistics vehicle it belongs in. The server may additionally map the received tag ID to a corresponding package. Based on these mappings, the server infers that the package 340-1, for example, is located within the logistics vehicle 314. It is understood, however, that in some embodiments, such backend server functionality is alternatively performed at the RFID reader device 350 itself or other computing device local to or within the logistics vehicle 314.

V. Example Technology

FIG. 4 is a schematic diagram illustrating that the technology described herein can be used to track a package to a vehicle and confirm that the package has been loaded onto the correct vehicle. As shown, FIG. 4 includes two delivery vehicles, 402 and 404. In instances, as the loader 406 picks up a package to load onto one of the two vehicles, 402 and 404. Based on the antennae, such as antennae 320, 322, 324, and 326 of FIG. 3, being within a communication capability threshold, signal strength threshold, and or distance threshold relative to the tag 412, the reader device automatically reads the data from the tag 412 (in response to the antenna of the reader device receiving data from the tag 412) and/or automatically reads the machine readable indicia (not shown) from the shipping label 416. The shipping label 416 is attached to the package 412. Responsively, in some embodiments, a decoder within the reader device (e.g., a wand) decodes the machine-readable indicia on the shipping label 416 to receive its decoded data, such as a tracking number. In some embodiments, the device then transmits, over a computer network, the decoded tracking number to a server, which then determines whether the loader 406 is in proximity to the correct delivery vehicle for placement of the package 412. The readable device may receive signal that the loader 406 is within proximity of the correct delivery vehicle for loading and provide guidance to the loader 406 to load the package 412 accordingly. Additionally, if loader 406 loads package 412 on the wrong vehicle, the device may transmit a signal indicating that the package has been loaded incorrectly. For example, if delivery vehicle 402 is the correct vehicle for placement of package 412 and delivery vehicle 404 is the incorrect vehicle, if loader 406 loads the package 412 onto delivery vehicle 404 instead of 402, the reader device may automatically detect that the package 412 has been loaded incorrectly and transmit a signal to the loader 406. The loader 406 can then retrieve the package 412 and immediately correct the incorrect placement so that the item is now loaded onto the correct vehicle (e.g. vehicle 402). This almost immediate detection of a misload and guidance provided to the loader that allows correction of the misload improves both the efficiency and effectiveness of the delivery process. Rather than detecting that the parcel has been misplaced upon arriving at the delivery location or en route, the correction can be made almost immediately which provides significant cost and time savings to logistics careers and decrease the change of customer dissatisfaction.

VI. Example System Architecture

Referring now to FIG. 5, which illustrates an example system (referred to as the "system 500") suitable for implementing embodiments of the disclosure. FIG. 5 illustrates a smart preload system 500 that provides for a more efficient and effective loading and delivery process. Prior to loading packages, device readers 502, 504, and 506 scan and link the parcels that are ready to be placed in the delivery vehicles 508 and 510. The reading devices 502, 504, and 506 may scan the parcels as they arrive on the loading belt and confirm data regarding the destination of the parcel and confirm that the parcel is in the correct location. The loader, 512 will place packages from the loading belt onto each delivery vehicle based on the assigned data received from the device readers. For example, when a package, such as package 514, is loaded on the correct vehicle 510, the device readers 502, 504, and 506 will detect such correct placement and can send a confirmation through the system 500. By contrast, the readers 502, 504, and 506, will detect any misloads and transmit such information in real-time to the loader 512. For example, the exclamation point shown on parcel 518 that has been placed in vehicle 508 indicates that the reader devices 502, 504, and 508 (individually or collectively) have determined that parcel 518 has been misloaded. This information is sent in real-time to the smart package engine 520 where the smart package engine 520 will then provide a direct notification to the loader 512 that the package 518 has been misloaded. The system 500 may also have components which monitor and follow up with the loader 512 to ensure that the correction has been made. Additionally, data regarding the package and delivery process is stored in a data repository, such as repository 530.

Example Computing System Architecture

Referring now to FIG. 6, a block diagram illustrating an example computing system architecture (referred to as the "system 600") suitable for implementing embodiments of the disclosure. The system 600 is generally responsible for classifying one or more portions of an input image. The system 600 includes a logistics vehicle asset assigning module 601, real-time loader feedback module 602, a mislead detector 604, a notification module 608, and storage 612, each of which is communicatively coupled to each other via one or more networks 610. The network(s) 610 is any suitable network(s), such as a Local Area Network (LAN), a Wide Area Network (WAN), the internet, or a combination of these, and/or include wired, wireless, or fiber optic connections. In general, network(s) 610 represent any combination of connections (e.g., APIs or linkers) or protocols that will support communications between the components of the system 600. In some embodiments, the components of the system 600 are embodied as a set of compiled computer instructions or functions, program modules, computer software services, logic gates, or an arrangement of processes carried out on one or more computer systems.

The logistics vehicle asset assigning module 601 is generally responsible for associating (e.g., via a data structure) an asset to a specific logistics vehicle for a loader to load the asset in. In other words, the asset assigning module 601 assigns an asset to a particular logistics vehicle for loading. In some embodiments, this is done automatically. In other embodiments, this is done based on receiving user feedback. For example, a clerk at a hub or logistics store may scan, via a reader device, a tag or label on an asset, which identifies the asset. Based on a destination for a logistics vehicle being in a particular state and the asset going to that state (as indicated in the tag or label), the clerk may indicate that the asset is to be loaded in the specific logistics vehicle, which may cause a data structure to associate the asset with the logistics vehicle.

The real-time loader feedback module 602 is generally responsible for providing near real-time feedback to a user device (e.g., the mobile device 130) that indicates whether an associated user heading towards the correctly assigned vehicle (as determined via the logistics vehicle asset assigning module 601). For example, referring back to FIG. 1, and as described herein, the reference tag(s) 110 and/or the reader device(s) 112 can be used to detect whether the user 108 is approaching the correctly assigned logistics vehicle 114. In an illustrative example, in response to a subset of the reader devices 112 being within a communication range of the tag 104-1 of the asset 104 (based on the subset of reader devices being able to read data from the tag 104-1), where the subset or reader devices is located near the logistics vehicle 114, the real-time loader feedback module 602 associates, via one or more data structures, the reader device IDs of the subset to a particular location next to the logistics vehicle 114, and then associates the tag ID of tag 104-1 to logistics vehicle 114 (based on functionality of the logistics vehicle asset assigning module 601) to determine the correctly assigned logistics vehicle. Accordingly, the real-time loader feedback module 602 responsively predicts or infers that the asset 104 is headed towards the correctly assigned logistics vehicle 114 and programmatically calls, for example, the notification module 608, which causes a notification to responsively be made to a user device such as, "you are heading towards the correct logistics vehicle." In some embodiments, this same logic and functionality is applied when the user is headings towards an incorrectly assigned logistics vehicle. For example, the subset of the reader device described above may be mapped to and closer to the logistics vehicle 116. Accordingly, a notification can be transmitted, which indicates that the user is heading towards the incorrect logistics vehicle for loading.

The misload detector 604 is generally responsible for detecting misloads—i.e., whether a particular asset is inside a correctly assigned logistics vehicle or whether the asset has been transported to a correctly assigned logistics vehicle. In some embodiments, such detection is based at least in part on readings from the reader device 118, the tag(s) 122 of FIG. 1. For example, in response to receiving an indication that the reader device 218 of FIG. 2 has read or decoded data located within the tag of the asset 240-1 (in response to the antenna 220 receiving a tag id from the tag), the mislead detector 604 determines or predicts (via a confidence score) that the asset 240-1 is located in the logistics vehicle 214.

The notification module 608 is generally responsible for providing one or more notifications (e.g., visual display prompts or audio feedback) in association with the real-time loader feedback module 602 and the misload detector 604. For example, in response to the misload detector 604 detecting that an asset is inside a logistics vehicle, which is not assigned for the asset, the mislead detector 604 programmatically calls, over the network(s) 610, the notification module 608, which then causes an alert to be provided, such as display of natural language indicia that reads, "you have placed package XYZ inside the incorrect package car. Please place inside package inside package car ABC."

The system 600 also includes storage 612. In some embodiments, the storage 612 represents any storage device, such as RAM, cache, flash, disk, etc. In some embodiments, the storage 612 represents any storage system, such as RAID or a Storage Area Network (SAN). In some embodiments, the storage 612 represents alternative or additionally data stores, such as a relational database, a graph database, and the like. In some embodiments, any of the data structures and logic described herein is stored to the storage 612.

VII. Example Data Structures

FIG. 7 is a schematic diagram of an example data structure 700 for mapping a tag ID to an assigned logistics vehicle, according to some embodiments. In some embodiments, the data structure 700 (e.g., a hash map or lookup table) is what the logistics vehicle asset assigning module 601 reads or writes to in order to assign a particular asset to be loaded into a particular logistics vehicle. For example, referring back to FIG. 1, in response to the reader device 112 reading or decoding a tag ID—tag ID 1—of the tag 104-1, the reader device 112 transmits, to a server, the tag ID 1 and the server looks up the tale 700 using the tag ID 1 as a key in order to map the tag ID to both the asset ID—A—and the assigned logistics vehicle—XJ5.

FIG. 8 is a schematic diagram of an example data structure 800 for mapping a reader device ID to a logistics vehicle ID, according to some embodiments. In some embodiments, the data structure 800 (e.g., a hash map or lookup table) is what the misload detector 604 reads or writes to in order to detect misloads or whether an asset is inside a correctly assigned logistics vehicle. For example, referring back to FIG. 1, in response to the reader device 118 reading the tag ID of the tag 104-1 (because the asset 104 is presumably now within the logistics vehicle 114), the reader device 118 transmits, over a network, its ID, 1, as well as the tag ID of the tag 104-1 to a central server. The server then looks up the table 700 using the transmitted reader device ID 1 as a key in order to map the reader device ID to the logistics vehicle it is located in—TXL. The server then calls a function to lookup the data structure 700 in order to check if the received tag ID maps to the same vehicle as the reader device ID. If there is a same match between the logistics vehicle IDs, then the misload detector 604 generates a score indicative of a high probability that a particular asset is inside its correctly assigned logistics vehicle.

FIG. 9 is a schematic diagram of an example data structure 900 for mapping a reference tag ID to a logistics vehicle ID, according to some embodiments. In some embodiments, the data structure 900 (e.g., a hash map or lookup table) is what the misload detector 604 reads or writes to in order to detect misloads or whether an asset is inside a correctly assigned logistics vehicle. For example, referring back to FIG. 1, in response to the reader device 118 reading the tag ID of the reference tag 122, the reader device 118 transmits, over a network, its ID, 1, as well as the tag ID, 5, to a central server. The server then looks up the table 900 using the transmitted tag ID 5 as a key in order to map the tag ID 5 to the logistics vehicle it is located in—FRD. The server then calls a function to lookup the data structure 700 in order to check if a received tag ID maps to the same vehicle ID. If there is a same match between the logistics vehicle IDs, then the misload detector 604 generates a score indicative of a high probability that a particular asset is inside its correctly assigned logistics vehicle.

FIG. 10 is a schematic diagram of an example data structure 1000 for mapping a reader device ID and/or a tag ID to a geographical ID, according to some embodiments. In some embodiments, a "geographical ID" is any suitable predefined area, such as a room, a section, a building, or the like. In some embodiments, the data structure 1000 (e.g., a hash map or lookup table) is what the real-time loader feedback module 602 reads or writes to in order to provide near real-time feedback to a user device indicating whether a user is heading to a correctly assigned logistics vehicle.

For example, referring back to FIG. 1, in response to the reader device 112 reading the tag ID of the asset tag 104-1 (because the asset 104 is presumably near the reader device 112 since the user 108 is walking near the area), the reader device 112 transmits, over a network, its ID, 8, and tag ID 1 of the tag 104-1 to a central server. The server then looks up the table 1000 using the transmitted reader ID 8 as a key in order to map the reader ID 8 to the geographical area it is attached to—AB. The server then calls a function to lookup the data structure 700 in order to check what logistics vehicle the received tag ID 1 maps to. The server then compares the logistics vehicle ID and its location to a location that the tag ID8 is associated with, such as via a network graph. In some embodiments, the server then computes a distance (e.g., a network graph distance) and/or a direction of travel indication (based on prior readings of other reader device 112) between the locations and if they are within a distance threshold or heading threshold, the server causes a notification to be transmitted that the user is heading in a direction of the correctly assigned logistics vehicle.

VIII. Example System Operation

FIG. 11 is a flow diagram of an example process 1100 for determining whether an asset is inside a logistics vehicle, according to some embodiments. The process 1100 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, the process 1100 may not include block 1008. The computer-implemented method, the system (that includes at least one computing device having at least one processor and at least one computer readable storage medium), and/or the computer program product/computer storage media as described herein may perform or be caused to perform the process 1000, and/or any other functionality described herein.

Per block 1105, some embodiments begin with associating a first tag with a first parcel. The first tag associated with the first parcel may be received from a reading device that is in or coupled to a delivery vehicle. In other instances, the reading device may be coupled to a wall or other surface within the delivery warehouse. In some embodiments, an "indication" described herein refers to any suitable value of set of values, such as a flag, Boolean, float or other value that identifies a tag or reader device. For example, the receiving of the first indication that the first reader device has read the data of the first tag can simply mean receiving, by a server, a tag ID of a tag that the first reader device has read. Such tag ID itself is an "indication" that the first reader device has read the data from the first tag. In other embodiments, the receiving of the indication means receiving both the tag ID, a reader device ID of the first reader device.

In some embodiments, in response to associating a first tag with a first parcel at block 1105, a data structure that indicates that the first parcel is assigned to be placed in a first logistics vehicle of a plurality of logistics vehicle (e.g., of a plurality of logistics vehicles) is accessed at block 1110. For example, as described with respect to FIG. 6, in some embodiments, the logistics vehicle asset assigning module 601 accesses (e.g., retrieves in computer memory) the data structure 600 of FIG. 6, which indicates that a the first asset is assigned to be loaded into logistics vehicle XJ5 based on the first asset's ID-A—being mapped to the respective logistics vehicle.

In some embodiments, in response to accessing such data structure, some embodiments transmit, to the first reader device or a third device (e.g., the mobile device 103 of FIG. 1) associated with the user, a notification that directs the user to the first logistics vehicle. In some embodiments, such notification is a simple location indicator (e.g., geo-coordinates and a map) that visually illustrates where the first logistics vehicle is. In some embodiments, such notification additionally or alternatively includes step-by-step instructions the user must take to arrive at the first logistics vehicle. For example, "first walk 20 feet in the North direction, then turn left and start walking for about 10 feet, and the correct package car will be on your left."

In some embodiments, the second reader device is located in a second logistics vehicle, of a plurality of logistics vehicles, or an environment that the user is in that is outside of any logistics vehicle, such as described above with respect to the reference tag(s) 110 and the reader device(s) 112 of FIG. 1.

As described herein, some embodiments transmit near real-time feedback indicating whether the user is heading towards the first logistics vehicle. In some embodiments, this includes the functionality as described with respect to the real-time loader feedback module 602. For example, subsequent to the receiving of the first indication, some embodiments detect, at a first time, a first signal strength or location associated with the first reader device coupled to an environment that the user is in reading data of a tag coupled to an asset that the user is carrying. For example, in response to the first reader device, such as the reader device 112, transmitting a tag identifier received from the asset tag 104-1, a server accesses the data structure 1000 to map the reader device identifier to the geographic ID it is located in (thus detecting the location where the reader device 112 read the asset tag 104-1 and thus inferring the position of the user).

Continuing with this example, subsequent to the detecting of the first signal strength or location, some embodiments detect, at a second time, a second signal strength or location associated with the first reader device reading data of a third tag (e.g., another one of the reference tag(s) 110) coupled to the environment that the user is in.

Based on the accessing of the data structure (e.g., the data structure 600) and the first and second signal strength or location, some embodiments transmit, to the first device, near real-time feedback indicating whether the user is heading towards the first logistics vehicle. For example, referring back to FIG. 1, the second tag may be one of the reference tag(s) 110, which is located near the conveyor apparatus 102 and the third tag may be one of the reference tag(s) 110, which is located near (e.g., within a threshold distance of) the logistics vehicle 114. Accordingly, from this data, because it can be inferred that at the first time the user was near the conveyor apparatus 102 and at the second time the user was near the logistics vehicle 114, particular embodiments generate a score indicating a confidence level indicating that the user is likely heading towards the first logistics vehicle 114 or the correctly assigned logistics vehicle.

Continuing with FIG. 11, per block 1120, some embodiments receive receiving a first indication that a first device has read the data of the first tag, the first device being located within the first unit. Per block 1130, based at least in part on the receiving of the first indication, some embodiments determine whether the first asset is in the first logistics vehicle (regardless of whether the first logistics vehicle is a correctly assigned vehicle for the first asset). For example, referring back to FIG. 1, in response to receiving the second indication that the reader device 118 (which is inside the logistics vehicle 114) has read data from the tag 104-1 particular embodiments generate a score indicating a high confidence level (e.g., a 90% likelihood) that the first asset is inside the logistics vehicle 114. In some embodiments, block 1006 is alternatively or additionally based at least in part on the accessing of the data structure (e.g., the data structure 600 of FIG. 6). For example, not only can embodiments determine that an asset is inside a particular logistics vehicle but can also determine that an asset is in the correctly assigned vehicle based on the mapping of the tag ID to the logistics vehicle ID via the data structure 600.

As described herein, some embodiments provide near real-time feedback indicating whether the user is heading towards the first logistics vehicle. In some embodiments, this is based on multiple reader devices reading the tag attached to an asset. For example, subsequent to the receiving of the second indication, some embodiments detect, at a first time a first signal strength or location associated with the second reader device (e.g., reader device 112) reading the data of the first tag. Subsequent to such detecting, some embodiments additionally detect, at a second tie, a signal strength or location associated with a third reader device (e.g., the reader device 118) reading the data of the first tag (e.g., a tag ID of the tag 104-1). Based on the accessing of the data structure (e.g., the data structure 600) and the first and second signal strength or location, some embodiments transmit, to the first reader device or third device associated with the user, near real-time feedback indicating whether the user is heading towards the first logistics vehicle, as described above.

Per block 1130, in some embodiments, it is determined that the first parcel has been placed inside the first assigned unit. In response to determining that the first parcel has been placed inside the assigned first unit, transmitting a first notification to a user device associated with a first user, the first notification indicates that the first parcel has been placed inside the assigned first unit at block 1140. For example, if it detected that the first asset is inside the first logistics vehicle, particular embodiments transmit a notification to a user device, which causes display of indicia that reads, "you have placed the package in the correct vehicle" or "you have placed the package in vehicle XYZ, which is an incorrectly assigned vehicle." However, if it detected that the first asset is inside a different vehicle, particular embodiments transmit a notification to a user device, which causes display of indicia that reads, "the package has been placed in the incorrectly assigned vehicle." In some embodiments, the notification at block 1008 includes (or alternatively represents) indicating whether the first asset has been transported to a correctly assigned vehicle. For example, the notification may read, "loader Y has transported package X to correctly assigned vehicle P."

IX. Apparatuses, Methods, and Systems

Embodiments of the present disclosure may be implemented in various ways, including as apparatuses that comprise articles of manufacture. An apparatus or system may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

X. Example Computing Environment

FIG. 12 is a schematic diagram of an example computing environment 1200 in which aspects of the present disclosure are employed in, according to some embodiments. As shown in FIG. 12, this particular computing environment 1200 includes one or more analysis computing entities 05 (e.g., a shipping company mainframe, cloud computing nodes, and/or logistics store desktop), a plurality of reader devices 25 (e.g., RFID readers), a plurality of reference tags (e.g., multiple RFID tags placed in a room), one or more target tags 72 (located on one or more assets 70), one or more source computing entities 10 (e.g., a mobile device, such as a DIAD or mobile phone), one or more logistics vehicles 11 (which include one or more additional reader devices and/or reference tags), and logistics server 30, which is communicatively coupled via one or more networks 510.

In some embodiments, "communicatively coupled" means that two or more components can perform data transportation between each other via a wired (e.g., Ethernet or fiber-optic medium connected in a LAN) or wireless (e.g., IEEE 802.15.4) computer protocol network. Each of these components, entities, devices, systems, and similar words used herein interchangeably may be in direct or indirect communication with one another over, for example, the same or different wired and/or wireless networks. Additionally, while FIG. 11 illustrates the various system entities as separate, standalone entities, the various embodiments are not limited to this particular architecture. In some embodiments, there are more or fewer (or combined) components than illustrated in the environment 1200.

In some embodiments, one or more components of the environment 1200 represent corresponding components as described herein. In some embodiments, the analysis computing entity 05 represents the "server" as described herein. In some embodiments, the logistics vehicle represents the logistics vehicle 114 or 116, of FIG. 1 or 314 of FIG. 3. In some embodiments, the reader devices represents the reader devices 25 represent the reader device(s) 112 of FIG. 1. In some embodiments, the tags 23 represent the reference tag(s) 110 of FIG. 1.

In some embodiments, each of the components of the system 600 of FIG. 6 are located within the analysis computing entity 05. In some embodiments, the components of the system 500 of FIG. 6 are distributed among the components of the environment 1200. For example, in some embodiments, the real-time loader feedback module 602, the mislead detector 604, and/or the notification module 608 are hosted on the reader device 10.

In various embodiments, the network(s) 510 represents or includes an IoT (internet of things) or IoE (internet of everything) network, which is a network of interconnected items (e.g., asset 70, the reader device 10, the logistics vehicle 11, the environment tags 23, and logistic server(s) 05) that are each provided with unique identifiers (e.g., UIDs) and computing logic so as to communicate or transfer data with each other or other components. Such communication can happen without requiring human-to-human or human-to-computer interaction. For example, an IoT network may include the mobile computing entity 10 that includes an application, which sends a request, via the network(s) 510, to the analysis computing entity 05 to determine or predict where the asset 70 is located. Responsively, the reader devices 25, the environment tags 23, and the asset tag(s) 72 may help generate sensor data so that the logistics server(s) 05 can analyze the data, as described in more detail below. In the context of an IoT network, a computing device can be or include one or more local processing devices (e.g., edge nodes) that are one or more computing devices configured to store and process, over the network(s) 510, either a subset or all of the received or respective sets of data to the one or more remote computing devices (e.g., the source computing entities 10 and/or the analysis computing entity 05) for analysis. An "asset" as described herein is any tangible item that is capable of being transported from one location to another. Assets may be or include the contents that enclose a product or other items people wish to ship. For example, an asset may be or include a parcel or group of parcels, a package or group of packages, a box, a crate, a drum, a container, a box strapped to a pallet, a bag of small items, and/or the like.

In some embodiments, the local processing device(s) described above is a mesh or other network of microdata centers or edge nodes that process and store local data received from the source computing entity 10 (e.g., a user device), the analysis computing entity 05, the reader devices 25, the tag 72, the tags 23, and/or the logistics vehicle 11, and push or transmit some or all of the data to a cloud device or a corporate data center that is or is included in the one or more analysis computing entities 05. In some embodiments, the local processing device(s) store all of the data and only transmit selected (e.g., data that meets a threshold) or important data to the one or more logistics servers 105. Accordingly, the non-important data or the data that is in a group that does not meet a threshold is not transmitted. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 510. Accordingly, in these embodiments, the one or more local processing devices can be associated with one or more gateway devices that translate proprietary communication protocols into other protocols, such as internet protocols.

The reader devices 10, and/or the reader devices within the logistics vehicle 11 are generally responsible for interrogating or reading data emitted from or located on the tags 23 and/or the tag 72. Each of the reader devices 25 may be any suitable reader machine, manufacture, or module. For example, the reader devices 25 can be Radio Frequency Identification (RFID) readers, Near-field Communication (NFC) readers, optical scanners, optical readers, bar code scanners, magnetic ink character recognition readers, beacon readers, or the like. The reader devices 25 can be coupled to or placed in any suitable location, such as a particular distance, orientation, and/or height from storage unit, on the ceiling of a building, on the floor of the building, one the walls of the building, and/or on any structure within a geographical area.

Each of the tags 23 and/or the tag 72 is generally responsible for indicating or emitting/transmitting data (e.g., to respective reader devices 25), such as an identifier that identifies the respective tag, which can be used to predict the location of the target tag(s) 72 (or more generally the asset 70), as described above. For example, indications that a subset of specific reader devices 25 are reading data from the target tag 72 can indicate that the target tag 72 is located in a particular geographical area (e.g., a particular room or section of a building) based on a predefined mapping data structure that associates each reader with a room. The tags 23 are placed in any suitable physical environment, geographical area, and/or apparatus (e.g., one or more storage units) within such physical environment or geographical area. A "geographical area" as described herein is any suitable location, such as one or more rooms or sections of a building, the inside of a building, the area within a logistics vehicle, the inside of a logistics store, an outdoor construction yard, the inside of a warehouse, a neighborhood, and/or any suitable area within a geofence or perimeter. The environment tags 23 can be coupled to or placed in any suitable location, such as attached to a front portion of a storage unit, on the ceiling of a building, on the floor of the building, on the walls of a building, and/or any structure, position, or orientation within a geographical area.

The tag(s) 72 are typically attached or otherwise coupled to target asset(s) 70, which need to be loaded in a particular logistics vehicle. Each of the target tag(s) 72 is generally responsible for indicating or emitting/transmitting data (e.g., to respective reader devices 25), such as an identifier that identifies the respective target tag, which can be used to predict the location of the target tag 72 (or more generally the asset 70), as described above. Each of the tags 23, and/or the target tag(s) 72 may be or include any suitable tag, machine, manufacture, module, and/or computer-readable indicia. "Computer-readable indicia" as described herein is any tag (e.g., RFID or NFC tag) information, bar code, data matrix, numbers, lines, shapes, and/or other suitable identifier that is machine-readable (and tend not to be readable by a human) because machines can process the data. For example, the target tag(s) 72 and/or the environment tags 23 can be Radio Frequency Identification (RFID) tags (active or passive), Near-field Communication (NFC) tags, optical computer-readable indicia, bar code computer-readable indicia, magnetic ink character recognition computer-readable indicia, and/or beacons or the like.

The logistics server 105 comprises a configuration file mapping component 130, an accessor 135, an indication receiver 140 and a determiner 145. The configuration file mapping component 130 is configured to map the plurality of parcels being transported through a logistics network with tags in order to track the parcel through the process. The configuration file mapping component 130 accesses data about the parcel, including for example, the size of the parcel, the shipping information, the route for the parcel, and other data that is needed to accurately transport the parcel through the delivery process. The accessor 135 accesses a data structure that indicates that a parcel is assigned to be placed in a specific logistics vehicle of a plurality of logistics vehicles. For example, the accessor 135 may access data that indicates that parcel 104 of FIG. 1 should be loaded into vehicle 114. Utilizing this data, the indication receiver 140 will receive an indication that the first device has read the first tag data indicating that which vehicle the specific parcel should be placed in. Then, the determiner 145 will determine whether the first parcel has been placed inside the assigned first unit. Upon this determination, the notifier 150 transmits a notification to a user device associated with a user indicating that the first parcel has been placed inside the assigned first unit.

XI. Example Analysis Computing Entity

FIG. 13 is a block diagram of the analysis computing entity 05 of FIG. 11, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the analysis computing entity 05 may also include one or more communications interfaces 24 for communicating with various computing entities, such as by communicating data, content, information/data, and/or similar terms used herein interchangeably that can be transmitted, received, operated on, processed, displayed, stored, and/or the like.

As shown in FIG. 13, in particular embodiments, the analysis computing entity 05 may include or be in communication with one or more processing elements 1305 (also referred to as processors, processing circuitry, and/or similar terms used herein interchangeably) that communicate with other elements within the analysis computing entity 05 via a bus, for example. As will be understood, the processing element 1305 may be embodied in a number of different ways. For example, the processing element 1305 may be embodied as one or more complex programmable logic devices (CPLDs), microprocessors, multi-core processors, coprocessing entities, application-specific instruction-set processors (ASIPs), microcontrollers, and/or controllers. Further, the processing element 1305 may be embodied as one or more other processing devices or circuitry. The term circuitry may refer to an entirely hardware embodiment or a combination of hardware and computer program products. Thus, the processing element 1305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 1305 may be configured for a particular use or configured to execute instructions stored in volatile or non-volatile media or otherwise accessible to the processing element 1305. As such, whether configured by hardware or computer program products, or by a combination thereof, the processing element 1305 may be capable of performing steps or operations according to embodiments of the present disclosure when configured accordingly.

In particular embodiments, the analysis computing entity 05 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 22, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the analysis computing entity 05 may further include or be in communication with volatile media (also referred to as volatile storage, memory, memory storage, memory circuitry and/or similar terms used herein interchangeably). In particular embodiments, the volatile storage or memory may also include one or more volatile storage or memory media 1315, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 1305. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 1305 and operating system.

As indicated, in particular embodiments, the analysis computing entity 05 may also include one or more communications interfaces 1320 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 05 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 05 may include or be in communication with one or more input elements, such as a keyboard input, a mouse input, a touch screen/display input, motion input, movement input, audio input, pointing device input, joystick input, keypad input, and/or the like. The analysis computing entity 05 may also include or be in communication with one or more output elements (not shown), such as audio output, video output, screen/display output, motion output, movement output, and/or the like.

As will be appreciated, one or more of the analysis computing entity's 05 components may be located remotely from other analysis computing entity 05 components, such as in a distributed system. Furthermore, one or more of the components may be combined and additional components performing functions described herein may be included in the analysis computing entity 05. Thus, the analysis computing entity 05 can be adapted to accommodate a variety of needs and circumstances. As will be recognized, these architectures and descriptions are provided for exemplary purposes only and are not limiting to the various embodiments.

XII. Example Source Computing Entity

Turning now to FIG. 14, a block diagram of a source computing entity 1410, according to some embodiments. In certain embodiments, source computing entity(s) 10 may be embodied as handheld computing entities, such as mobile phones, tablets, personal digital assistants, and/or the like, that may be operated at least in part based on user input received from a user via an input mechanism. Moreover, source computing entity(s) 10 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, source computing entity(s) 1410 may be utilized as onboard controllers for UAVs configured for picking-up and/or delivering packages to various locations, and accordingly such source computing entity(s) 1410 may be configured to monitor various inputs (e.g., from various sensors) and generated various outputs. It should be understood that various embodiments of the present disclosure may comprise a plurality of source computing entities 1410 embodied in one or more forms (e.g., kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a source computing entity 10 that may include one or more components that are functionally similar to those of the analysis computing entity 05. This figure provides an illustrative schematic representative of a source computing entity(s) 1410 that can be used in conjunction with embodiments of the present disclosure. In general, the terms device, system, source computing entity, user device, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Source computing entity(s) 10 can be operated by various parties, including carrier personnel (sorters, loaders, delivery drivers, network administrators, and/or the like). As shown this figure, the source computing entity(s) 1410 can include an antenna 1412, a transmitter 1404 (e.g., radio), a receiver 1406 (e.g., radio), and a processing element 1408 (e.g., CPLDs, microprocessors, multi-core processors, coprocessing entities, ASIPs, microcontrollers, and/or controllers) that provides signals to and receives signals from the transmitter 1412 and receiver 1406, respectively. In some embodiments, the source computing entity(s) 1410 additionally includes other components not shown, such as a fingerprint reader, a printer, and/or the camera.

The signals provided to and received from the transmitter 1404 and the receiver 1406, respectively, may include signaling information in accordance with air interface standards of applicable wireless systems. In this regard, the source computing entity(s) 1410 may be capable of operating with one or more air interface standards, communication protocols, modulation types, and access types. More particularly, the source computing entity(s) 1410 may operate in accordance with any of a number of wireless communication standards and protocols, such as those described above with regard to the analysis computing entity(s) 05. In a particular embodiment, the source computing entity(s) 10 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the source computing entity(s) 1410 may operate in accordance with multiple wired communication standards and protocols, such as those described above with regard to the analysis computing entity(s) 05 via a network interface 1420.

Via these communication standards and protocols, the source computing entity(s) 1410 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The source computing entity(s) 10 can also download changes, add-ons, and updates, for instance, to its firmware, software (e.g., including executable instructions, applications, program modules), and operating system.

According to particular embodiments, the source computing entity(s) 1410 may include location determining aspects, devices, modules, functionalities, and/or similar words used herein interchangeably. For example, the source computing entity(s) 10 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 10 position in connection with a variety of other systems, including cellular towers, Wi-Fi access points, and/or the like. Similarly, the source computing entity(s) 10 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The source computing entity(s) 1410 may also comprise a user interface (that can include a display 1416 coupled to a processing element 1408) and/or a user input interface (coupled to a processing element 1408). For example, the user interface may be a user application, browser, user interface, and/or similar words used herein interchangeably executing on and/or accessible via the source computing entity 1410 to interact with and/or cause display of information from the analysis computing entity 05, as described herein. The user input interface can comprise any of a number of devices or interfaces allowing the source computing entity(s) 1410 to receive information/data, such as a keypad 1418 (hard or soft), a touch display, voice/speech or motion interfaces, or other input device. In embodiments including a keypad 40, the keypad 1418 can include (or cause display of) the conventional numeric (0-9) and related keys (#, *), and other keys used for operating the source computing entity(s) 1410 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in this figure, the source computing entity(s) 1410 may also include an camera 1426, imaging device, and/or similar words used herein interchangeably (e.g., still-image camera, video camera, IoT enabled camera, IoT module with a low resolution camera, a wireless enabled MCU, and/or the like) configured to capture images. The source computing entity(s) 1410 may be configured to capture images via the onboard camera 1426, and to store those imaging devices/cameras locally, such as in the volatile memory 1422 and/or non-volatile memory 1424. As discussed herein, the source computing entity(s) 10 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 1426. The contextual data may be stored as a portion of the image (such that a visual representation of the image data includes the contextual data) and/or may be stored as metadata associated with the image data that may be accessible to various computing entity(s) 1410.

The source computing entity(s) 1410 may include other input mechanisms, such as scanners (e.g., barcode scanners), microphones, accelerometers, RFID readers, and/or the like configured to capture and store various information types for the source computing entity(s) 1410. For example, a scanner may be used to capture parcel/item/shipment information/data from an item indicator disposed on a surface of a shipment or other item. In certain embodiments, the source computing entity(s) 1410 may be configured to associate any captured input information/data, for example, via the onboard processing element 1408. For example, scan data captured via a scanner may be associated with image data captured via the camera 1426 such that the scan data is provided as contextual data associated with the image data.

The source computing entity(s) 1410 can also include volatile storage or memory 1422 and/or non-volatile storage or memory 1424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the source computing entity(s) 1410. As indicated, this may include a user application that is resident on the entity or accessible through a browser or other user interface for communicating with the analysis computing entity 05 and/or various other computing entities.

In another embodiment, the source computing entity(s) 1410 may include one or more components or functionality that are the same or similar to those of the analysis computing entity 05, as described in greater detail above. As will be recognized, these architectures and descriptions are provided for exemplary purposes only and are not limiting to the various embodiments.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "coupled" to refers to two or more components being attached, fixed, or otherwise connected. Any suitable component can be used to couple components together, such as one or more: screws, bolts, nuts, hook fasteners, nails, adhesive, etc.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

What is claimed is:

1. A system comprising:
   at least one computer processor; and
   one or more computer storage media storing computer-readable instructions that, when executed by the at least one computer processor, cause the at least one computer processor to perform operations comprising:
   receiving a first indication that a reader device has received a first signal from an asset tag, wherein an antenna of the reader device is located inside a vehicle and the first indication comprises a first tag identifier for the asset tag and a first signal strength characteristic of the first signal received by the antenna of the reader device from the asset tag;
   determining, from accessing a data structure and based at least in part on the first tag identifier, that the asset tag is associated with an asset;
   receiving a second indication that the reader device has read a second signal from a reference tag, wherein the reference tag is located inside the vehicle and the second indication comprises a second tag identifier for the reference tag and a second signal strength characteristic of the second signal received by the antenna of the reader device from the reference tag;
   performing a trilateration of a location of the asset inside of the vehicle by comparing the first signal strength characteristic and the second signal strength characteristic; and
   recording the location of the asset inside the vehicle.

2. The system of claim 1, wherein the operations further comprise transmitting the location of the asset inside the vehicle to a device associated with a user.

3. The system of claim 1, wherein the operations further comprise:
   determining, from accessing the data structure, that the asset is assigned to be placed in the vehicle; and
   in response to determining the asset is assigned to be placed in the vehicle, transmitting a notification indicating that the asset has been placed in a correct vehicle to a device associated with a user.

4. The system of claim 1, wherein the operations further comprise:
   determining, from accessing the data structure, that the asset is assigned to be placed in a second vehicle; and
   in response to determining the asset is assigned to be placed in the second vehicle, transmitting a notification indicating that the asset has been placed in an incorrect vehicle to a device associated with a user.

5. The system of claim 1, wherein the operations further comprise identifying to a user the location of the asset inside the vehicle.

6. The system of claim 1, wherein the operations further comprise:
   receiving a second location of a user;
   comparing the location of the asset inside the vehicle and the second location;
   generating, based at last in part on comparing the location of the asset inside the vehicle and the second location, an instruction guiding the user to the location of the asset inside the vehicle; and
   transmitting the instruction for display to a device associated with the user.

7. The system of claim 1, wherein the operations further comprise:
   subsequent to receiving the first indication, receiving an indication that a second reader device has received a signal from the asset tag, wherein a second antenna of the second reader device is located outside of the vehicle and the indication comprises at least one of a signal strength characteristic of the signal received by the antenna of the second reader device from the asset tag or a current location of the asset tag; and
   based at least in part on the signal strength characteristic or the current location, transmitting, to a device associated with a user, near real-time feedback indicating the user is heading towards the vehicle.

8. A method comprising:
receiving, by a computing entity, a first indication that a reader device has received a first signal from an asset tag, wherein an antenna of the reader device is located inside a vehicle and the first indication comprises a first tag identifier for the asset tag and a first signal strength characteristic of the first signal received by the antenna of the reader device from the asset tag;
determining, by the computing entity and based at least in part on the first tag identifier, that the asset tag is associated with an asset;
receiving, by the computing entity, a second indication that the reader device has read a second signal from a reference tag, wherein the reference tag is located inside the vehicle and the second indication comprises a second tag identifier for the reference tag and a second signal strength characteristic of the second signal received by the antenna of the reader device from the reference tag;
performing, by the computing entity, a trilateration of a location of the asset inside of the vehicle by comparing the first signal strength characteristic and the second signal strength characteristic; and
recording, by the computing entity, the location of the asset inside the vehicle.

9. The method of claim 8, further comprising transmitting, by the computing entity and to a device associated with a user, the location of the asset inside the vehicle.

10. The method of claim 8, further comprising:
determining, by the computing entity, that the asset is assigned to be placed in the vehicle; and
in response to determining the asset is assigned to be placed in the vehicle, transmitting, by the computing entity and to a device associated with a user, a notification indicating that the asset has been placed in a correct vehicle.

11. The method of claim 8, further comprising:
determining, by the computing entity, that the asset is assigned to be placed in a second vehicle; and
in response to determining the asset is assigned to be placed in the second vehicle, transmitting, by the computing entity and to a device associated with a user, a notification indicating that the asset has been placed in an incorrect vehicle.

12. The method of claim 8, further comprising identifying, by the computing entity and to a user, the location of the asset inside the vehicle.

13. The method of claim 8, further comprising:
receiving, by the computing entity, a second location of a user;
comparing, by the computing entity, the location of the asset inside the vehicle and the second location;
generating, by the computing entity and based at last in part on comparing the location of the asset inside the vehicle and the second location, an instruction guiding the user to the location of the asset inside the vehicle; and
transmitting, by the computing entity and to a device associated with the user, the instruction for display.

14. The method of claim 8, further comprising:
subsequent to receiving the first indication, receiving, by the computing entity, an indication that a second reader device has received a signal the asset tag, wherein a second antenna of the second reader device is located outside of the vehicle and the indication comprises at least one of a signal strength characteristic of the signal received by the antenna of the second reader device from the asset tag or a current location of the asset tag; and
based at least in part on the signal strength characteristic or the current location, transmitting, by the computing and to a device associated with a user, near real-time feedback indicating the user is heading towards the vehicle.

15. At least one computer-storage medium having computer-executable instructions embodied thereon that, when executed by a computing system, cause the computing system to perform operations comprising:
receiving a first indication that a reader device has received a first signal from an asset tag associated with an asset, wherein an antenna of the reader device is located inside a vehicle and the first indication comprises a first tag identifier for the asset tag and a first signal strength characteristic of the first signal received by the antenna of the reader device from the asset tag;
receiving a second indication that the reader device has read a second signal from a reference tag, wherein the reference tag is located inside the vehicle and the second indication comprises a second tag identifier for the reference tag and a second signal strength characteristic of the second signal received by the antenna of the reader device from the reference tag;
performing a trilateration of a location of the asset inside of the vehicle by comparing the first signal strength characteristic and the second signal strength characteristic; and
recording the location of the asset inside the vehicle.

16. The at least one computer-storage medium of claim 15, wherein the operations further comprise transmitting the location of the asset inside the vehicle to a device associated with a user.

17. The at least one computer-storage medium of claim 15, wherein the operations further comprise:
determining that the asset is assigned to be placed in the vehicle; and
in response to determining the asset is assigned to be placed in the vehicle, transmitting a notification indicating that the asset has been placed in a correct vehicle to a device associated with a user.

18. The at least one computer-storage medium of claim 15, further comprising:
determining that the asset is assigned to be placed in a second vehicle; and
in response to determining the asset is assigned to be placed in the second vehicle, transmitting a notification indicating that the asset has been placed in an incorrect vehicle to a device associated with a user.

19. The at least one computer-storage medium of claim 15, wherein the operations further comprise:
receiving a second location of a user;
comparing the location of the asset inside the vehicle and the second location;
generating, based at last in part on comparing the location of the asset inside the vehicle and the second location, an instruction guiding the user to the location of the asset inside the vehicle; and
transmitting the instruction for display to a device associated with the user.

20. The at least one computer-storage medium of claim 15, wherein the operations further comprise:
subsequent to receiving the first indication, receiving an indication that a second reader device has received a signal the asset tag, wherein a second antenna of the second reader device is located outside of the vehicle and the indication comprises at least one of a signal strength characteristic of the signal received by the antenna of the second reader device from the asset tag or a current location of the asset tag; and based at least in part on the signal strength characteristic or the current location, transmitting, to a device associated with a user, near real-time feedback indicating the user is heading towards the vehicle.

* * * * *